United States Patent
Park et al.

(10) Patent No.: US 11,140,672 B2
(45) Date of Patent: Oct. 5, 2021

(54) CONTROL CHANNEL TRANSMITTING AND RECEIVING METHOD AND APPARATUS IN WIRELESS COMMUNICATION SYSTEM

(71) Applicant: Samsung Electronics Co., Ltd., Gyeonggi-do (KR)

(72) Inventors: Sungjin Park, Incheon (KR); Jeongho Yeo, Gyeonggi-do (KR); Jinyoung Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 63 days.

(21) Appl. No.: 16/626,197

(22) PCT Filed: Jun. 28, 2018

(86) PCT No.: PCT/KR2018/007329
§ 371 (c)(1),
(2) Date: Dec. 23, 2019

(87) PCT Pub. No.: WO2019/004739
PCT Pub. Date: Jan. 3, 2019

(65) Prior Publication Data
US 2020/0120645 A1 Apr. 16, 2020

(30) Foreign Application Priority Data
Jun. 28, 2017 (KR) .................. 10-2017-0082049
Dec. 1, 2017 (KR) .................. 10-2017-0164535

(51) Int. Cl.
*H04W 72/04* (2009.01)
*H04L 5/00* (2006.01)
*H04W 72/12* (2009.01)

(52) U.S. Cl.
CPC ......... *H04W 72/042* (2013.01); *H04L 5/0007* (2013.01); *H04L 5/0048* (2013.01);
(Continued)

(58) Field of Classification Search
CPC ........... H04W 72/042; H04W 72/0446; H04W 72/1289; H04L 5/0007; H04L 5/0048; H04L 5/0053
(Continued)

(56) References Cited

U.S. PATENT DOCUMENTS

| | | |
|---|---|---|
| 2013/0058240 A1 | 3/2013 | Kim et al. |
| 2015/0341148 A1 | 11/2015 | Kazmi et al. |
| 2019/0174440 A1 | 6/2019 | Kwak et al. |
| 2021/0014012 A1* | 1/2021 | Park ..................... H04L 5/0055 |

FOREIGN PATENT DOCUMENTS

| | | |
|---|---|---|
| KR | 1020110112789 | 10/2011 |
| KR | 1020180018301 | 2/2018 |

OTHER PUBLICATIONS

3GPP TS 38.321 V0.0.4 (Year: 2017).*
(Continued)

*Primary Examiner* — Peter G Solinsky
(74) *Attorney, Agent, or Firm* — The Farrell Law Firm, P.C.

(57) ABSTRACT

This disclosure relates to a communication technique which fuses a 5G communication system with IoT technology to support higher data transmission rates after a 4G system, and system thereof. This disclosure can be applied to intelligent services (for example, smart home, smart building, smart city, smart car or connected car, health care, digital education, retail, security and safety related services, and the like) on the basis of 5G communication technology and IoT related technology. An objective of the present invention is to provide a method and an apparatus for simultaneously providing different types (or same types) of services. To this end, a base station can transmit a first signal to a terminal, determine whether a resource allocated to the first signal is preempted by a second signal, and transmit downlink control information including an indicator indicating whether
(Continued)

the second signal preempts the resource allocated to the first signal to the terminal when the second signal preempts the resource allocated to the first signal.

15 Claims, 16 Drawing Sheets

(52) U.S. Cl.
CPC ....... *H04L 5/0053* (2013.01); *H04W 72/0446* (2013.01); *H04W 72/1289* (2013.01)

(58) Field of Classification Search
USPC .......................................................... 370/329
See application file for complete search history.

(56) References Cited

OTHER PUBLICATIONS

KT Corp., 3GPP TSG RAN WG1 NR Ad-Hoc#2, R1-1711474, Qingdao, P.R. China, Jun. 16, 2017, "Views on preemption indication for DL", pp. 4.

Samsung, 3GPP TSG RAN WG1 NR Ad-Hoc#2, R1-1710732, Qingdao, P.R. China, Jun. 16, 2017, "Indication of Preempted Resources in DL", pp. 5.

CATR, 3GPP TSG RAN WG1 NR Ad-Hoc#2, R1-1711342, Qindao, P.R. China, Jun. 16, 2017, "Discussion on the granularity of preemption indication", pp. 4.

* cited by examiner

CONTROL CHANNEL TRANSMITTING AND RECEIVING METHOD AND APPARATUS IN WIRELESS COMMUNICATION SYSTEM

PRIORITY

This application is a National Phase Entry of PCT International Application No. PCT/KR2018/007329 which was filed on Jun. 28, 2018, and claims priority to Korean Patent Application Nos. 10-2017-0082049 and 10-2017-0164535, which were filed on Jun. 28, 2017 and Dec. 1, 2017, respectively, the content of each of which is incorporated herein by reference.

TECHNICAL FIELD

The disclosure relates to a wireless communication system, particularly, to a method and apparatus for smoothly providing services in a communication system, and more particularly, to a method for transmitting and receiving control information in a communication system and a method for restricting control information searching of a terminal.

BACKGROUND ART

To meet demand for radio data traffic that is increasing since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a super high frequency (mmWave) band (e.g., like 60 GHz band). To relieve a path loss of a radio wave and increase a transfer distance of the radio wave in the super high frequency band, in the 5G communication system, beamforming, massive multiple input/multiple output (MIMO), full dimensional MIMO (FD-MIMO), array antenna, analog beam-forming, and large scale antenna technologies have been discussed. Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and received interference cancellation have been developed. In addition, in the 5G system, hybrid frequency-shift keying (FSK) and quadrature amplitude modulation (QAM) modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on have been developed.

Meanwhile, the Internet is evolving from a human-centric communication network in which information is generated and consumed by humans to the internet of things (IoT) network in which distributed components such as things exchange and process information. Internet of Everything (IoE) technology in which big data processing technology through connection with a cloud server, or the like is combined with the IoT technology also is emerging. In order to implement the IoT, technology elements such as the sensing technology, wired/wireless communication and network infrastructure, service interface technology, and security technology are required, thus, recent, research into the sensor network, machine to machine (M2M), and machine type communication (MTC) technologies for connection between things has been conducted. In the IoT environment, it is possible to provide an intelligent internet technology (IT) that is capable of collecting and analyzing data generated from connected things to create new values for human life. The IoT may be applied to various fields such as smart homes, smart buildings, smart cities, smart cars or connected cars, smart grids, health cares, smart appliances, and advanced medical services through existing information technology (IT) and fusion and convergence between various industries.

Thus, there are various attempts to apply the 5G communication system to the IoT network. For example, the sensor network, M2M, and MTC technologies are implemented by means of 5G communication technologies such as beamforming, MIMO, and array antenna. The application of the above-described cloud RAN as a big data processing technology is an example of convergence between the 5G technology and the IoT technology.

DISCLOSURE OF INVENTION

Technical Problem

As described above, a plurality of services may be provided to a user in a communication system, and in order to provide such a plurality of services to a user, there are demands for a method that can provide each service within the same time interval according to characteristics of the plurality of services and an apparatus using the same.

Solution to Problem

Embodiments of the specification are proposed to solve the above-described problems and are to provide a method and apparatus for simultaneously providing different types (or the same type) of services. In addition, the embodiments provide a method for configuring corresponding information as control information and transmitting the control information from a base station to a terminal in a situation where a specific type of service affects a different type of service or the same type of service (interference in a wireless communication environment). The terminal may receive the information through a control channel, and may adaptively perform a data reception method using the received information.

In accordance with an aspect of the disclosure, a method of receiving control information by a UE of a wireless communication system includes: determining whether to monitor interruption information; and receiving downlink control information including the interruption information using a specific radio network temporary identifier (RNTI) for the interruption information when the interruption information is monitored, wherein a transmission interval indicated by the interruption information is determined according to a configuration period of a downlink control channel to which the interruption information is transmitted, the interruption information indicates whether a previous transmission interval prior to the transmission interval including the interruption information is preempted, and the interruption information includes a bitmap indicating a frequency or time resource existing within the transmission interval.

Also, the monitoring of the interruption information may be performed when downlink data is scheduled for the UE or when downlink reference signal measurement is configured for the UE. Also, the monitoring of the interruption indicator may be performed, when a transmission interval in which transmission of the interruption indicator is previously configured is not an uplink transmission interval and downlink data is scheduled in the previous transmission interval, or when downlink reference signal measurement is configured for the UE. Also, the interruption indicator may indicate a resource of the previous transmission interval corresponding to a downlink transmission interval.

In accordance with another aspect of the disclosure, a method of transmitting control information by a BS of a wireless communication system includes: determining whether to transmit interruption information; and transmitting downlink control information including the interruption information using a specific RNTI for the interruption information when the interruption information is transmitted, wherein a transmission interval indicated by the interruption information is determined according to a configuration period of a downlink control channel to which the interruption information is transmitted, the interruption information indicates whether a previous transmission interval prior to the transmission interval including the interruption information is preempted, and the interruption information includes a bitmap indicating a frequency or time resource existing within the transmission interval.

In accordance with another aspect of the disclosure, a UE receiving control information of a wireless communication system includes: a transceiver; and a controller configured to be connected to the transceiver, and to determine whether to monitor interruption information and to receive downlink control information including the interruption information using a specific RNTI for the interruption information when the interruption information is monitored, wherein a transmission interval indicated by the interruption information is determined according to a configuration period of a downlink control channel to which the interruption information is transmitted, the interruption information indicates whether a previous transmission interval prior to the transmission interval including the interruption information is preempted, and the interruption information includes a bitmap indicating a frequency or time resource existing within the transmission interval.

In accordance with another aspect of the disclosure, a BS transmitting control information of a wireless communication system includes: a transceiver; and a controller configured to be connected to the transceiver, and to determine whether to transmit interruption information and to transmit downlink control information including the interruption information using a specific RNTI for the interruption information when the interruption information is transmitted, wherein a transmission interval indicated by the interruption information is determined according to a configuration period of a downlink control channel to which the interruption information is transmitted, the interruption information indicates whether a previous transmission interval prior to the transmission interval including the interruption information is preempted, and the interruption information includes a bitmap indicating a frequency or time resource existing within the transmission interval.

Advantageous Effects of Invention

According to the disclosure, it is possible to effectively transmit data using different types of services in a communication system. In addition, the disclosure may provide a method for coexistence of data transmission between heterogeneous services to satisfy the requirements of each service, to reduce the delay of a transmission time, and to enable efficient use of at least one of frequency-time and spatial resources. In addition, the disclosure may provide a downlink control information searching limitation of a UE to reduce the power consumption of the UE. In addition, the disclosure may provide a method for transmitting adaptive control information of a base station to efficiently use radio resources.

MODE FOR THE INVENTION

Figure 1:
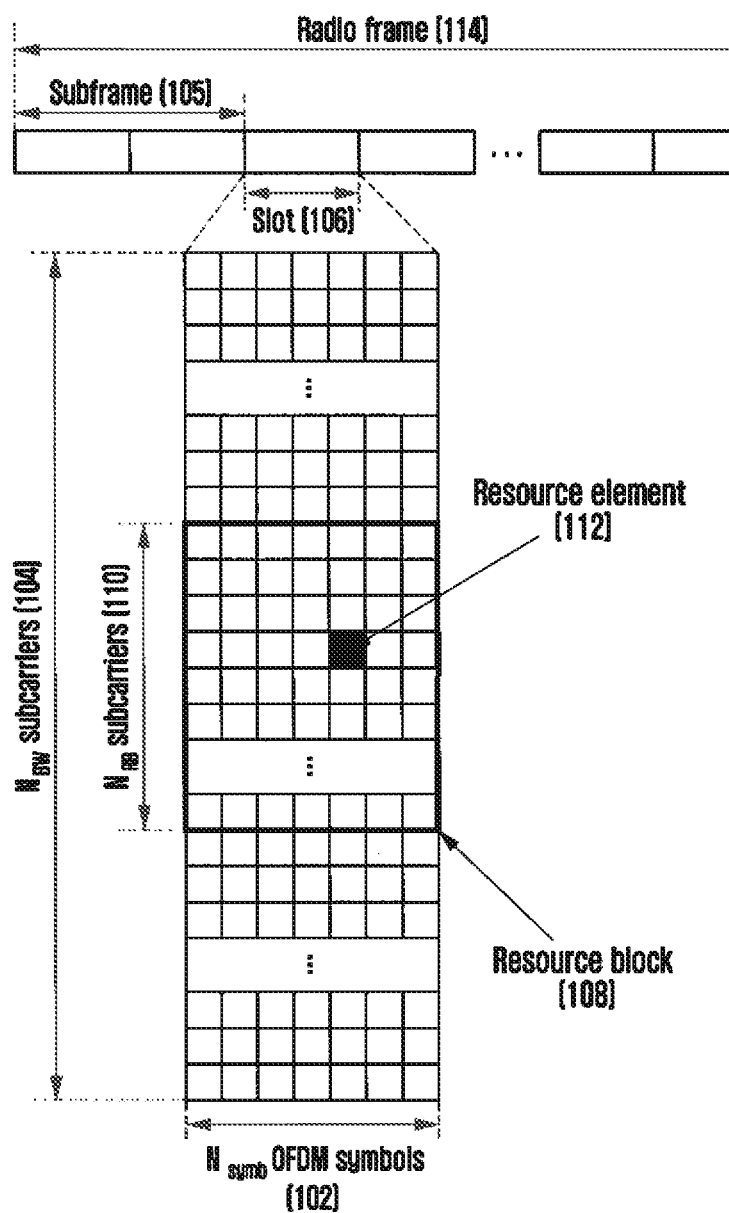
FIG. 1 is a diagram illustrating a basic structure of a time-frequency domain, which is a radio resource region in which data or control channels are transmitted in a downlink in an LTE system or a system similar thereto.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~unit' may include one or more processors.

A wireless communication system has been developed from a wireless communication system providing a voice-centered service in the early stage toward broadband wireless communication systems providing high-speed, high-quality packet data services compliant with communication standards, such as high-speed packet access (HSPA) and LTE or evolved universal terrestrial radio access (E-UTRA), LTE-Advanced (LTE-A), high-rate packet data (HRPD) and ultra-mobile broadband (UMB) of 3GPP2, 802.16e of the Institute of Electrical and Electronics Engineers (IEEE), and the like. In addition, the 5G or NR communication standards are being produced as the 5G wireless communication system.

As described above, in wireless communication systems including 5G, at least one service among enhanced mobile broadband (eMBB), massive machine-type communications (mMTC), and ultra-reliable and low-latency communications (URLLC) may be provided to at least one terminal. The above-described services may be provided to the same terminal during the same time period. In an embodiment, eMBB may be a service aiming at high-speed transmission of high-capacity data, mMTC may be a service aiming at terminal power minimization and access of multiple terminals, and URLLC may be a service aiming at high reliability and low latency, but the disclosure is not intended to be limited thereto. The three services may be a main scenario in an LTE system or a system such as 5G and/or NR after the LTE system. In an embodiment, a description is provided of a method for coexistence between eMBB and URLLC or coexistence between mMTC and URLLC, and an apparatus using the same.

When a base station has scheduled, for any terminal, data corresponding to an eMBB service during a particular transmission time interval (TTI), if there occurs a situation where URLLC data must be transmitted during the TTI, a part of the eMBB data may not be transmitted in a frequency band in which the eMBB data is already scheduled and transmitted, but the generated URLLC data may be transmitted in the frequency band. A terminal for which the eMBB data has been scheduled and a terminal for which the URLLC data has been scheduled may be identical or different. In the example, since there occurs a situation where a part of the eMBB data having already been scheduled and transmitted is not actually transmitted, the possibility that the eMBB data will be corrupted becomes higher.

Accordingly, in the example, it is necessary to provide a method for processing a received signal by the terminal for which the eMBB data has been scheduled or by the terminal for which the URLLC data has been scheduled, or a signal reception method thereof. Therefore, in an embodiment, a description is provided of a coexistence method between heterogeneous services for enabling transmission of information according to each service when a partial or entire frequency band is shared so as to schedule pieces of information (which may include data and control information) according to eMBB and URLLC; simultaneously schedule pieces of information according to mMTC and URLLC; simultaneously schedule pieces of information according to mMTC and eMBB; or simultaneously schedule pieces of information according to eMBB, URLLC, and mMTC.

Hereinafter, embodiments are described in detail with reference to the accompanying drawings. In the following description of the disclosure, a detailed description of known functions or configurations incorporated herein is omitted when the same may make the subject matter of the disclosure unclear. The terms described below are defined in consideration of the functions in the disclosure, and may be different according to the intention or practice of users and operators. Therefore, the definitions of the terms should be made based on the contents throughout the disclosure. Hereinafter, a base station is a main agent performing resource allocation for a terminal, and may be at least one of a gNode B, an eNode B, a Node B, a base station (BS), a wireless access unit, a base station controller, and a node on a network. A terminal may include a user equipment (UE), a mobile station (MS), a cellular phone, a smart phone, a computer, or a multimedia system capable of performing a communication function. In the disclosure, a downlink (DL) indicates a radio transmission path of a signal transmitted from a base station to a terminal, and an uplink (UL) indicates a radio transmission path of a signal transmitted from the terminal to the base station.

In addition, an embodiment implemented based on an LTE or LTE-advanced (LTE-A) system is described below by way of example, but the disclosure may be applied to other communication systems having a similar technical background or channel form. For example, 5G mobile communication technology (new radio (NR)), developed after LTE-A may be included in other communication systems. Further, according to the determination of those skilled in the art, embodiments may be applied to other communication systems through partial modification without departing from the scope of the disclosure.

As a representative example of broadband wireless communication systems, an LTE system adopts an orthogonal frequency division multiplexing (OFDM) scheme in a downlink, and adopts a single carrier frequency division multiple access (SC-FDMA) scheme in an uplink. The term "uplink" refers to a radio link through which a terminal, user equipment (UE), or a mobile station (MS) transmits data or a control signal to a base station (BS)(or gNode B), and the term "downlink" refers to a radio link through which a base station transmits data or a control signal to a terminal. The above-described multiple access scheme normally allocates and operates time-frequency resources, which carry data or control information to be transmitted according to users, so as to prevent the time-frequency resources from overlapping each other, that is, establish orthogonality, thus making it possible to distinguish the data or control information of one user from another.

If a decoding failure occurs upon initial transmission, the LTE system adopts a hybrid automatic repeat request (HARQ) scheme for retransmitting the relevant data in a physical layer. If a receiver fails to accurately decode data, the HARQ scheme enables the receiver to transmit, to a transmitter, information (negative acknowledgement (NACK)) providing notification of the decoding failure so that the transmitter can retransmit the relevant data in the physical layer. The receiver combines the data retransmitted by the transmitter with the data of which the decoding has failed, thereby increasing reception performance of the data. In addition, if the receiver accurately decodes the data, information (acknowledgement (ACK)) providing notification of decoding success is transmitted to the transmitter so that the transmitter may transmit new data.

FIG. 1 is a diagram illustrating a basic structure of a time-frequency domain, which is a radio resource region in which data or control channels are transmitted in a downlink in an LTE system or a system similar thereto.

Referring to FIG. 1, the horizontal axis represents a time domain and the vertical axis represents a frequency domain. A minimum transmission unit in the time domain is an OFDM symbol, in which $N_{symb}$ OFDM symbols 102 constitute one slot 106, and two slots constitute one subframe 105. The length of the slot is 0.5 ms and the length of the subframe is 1.0 ms. A radio frame 114 is a time domain interval composed of 10 subframes. A minimum transmission unit in the frequency domain is a subcarrier, and the bandwidth of the entire system transmission bandwidth is composed of a total of $N_{BW}$ subcarriers 104. However, these specific values may be applied variably.

The basic unit of a resource in a time-frequency domain may be represented by an OFDM symbol index and a subcarrier index as a resource element (RE) 112. A resource block (RB or physical resource block (PRB)) 108 may be defined as a resource consisting of $N_{symb}$ consecutive OFDM symbols 102 in the time domain and $N_{RB}$ consecutive subcarriers 110 in the frequency domain. Accordingly, one RB 108 in one slot may include $N_{symb} \times N_{RB}$ REs 112. In general, a frequency-domain minimum allocation unit of data is the RB, and in an LTE system, the $N_{symb}=7$ and the $N_{RB}=12$, and the $N_{BW}$ and the $N_{RB}$ may be proportional to a system transmission bandwidth. A data rate of data transmitted from a base station (BS) to a user equipment (UE) increases in proportion to the number of RBs scheduled to the UE.

In the LTE system, six transmission bandwidths may be defined and operated. In an FDD system that separates downlink and uplink by frequencies and operates the same, the downlink transmission bandwidth and the uplink transmission bandwidth may be different from each other. A channel bandwidth represents an RF bandwidth corresponding to the system transmission bandwidth. Table 1 below shows a corresponding relationship between the system transmission bandwidth and the channel bandwidth which are defined in the LTE system. For example, in an LTE system having a channel bandwidth of 10 MHz, the transmission bandwidth is composed of 50 BBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within first N OFDM symbols in the subframe. In this embodiment, N={1, 2, 3} is generally satisfied. Therefore, the value of N may be variably applied to each subframe according to the amount of the control information to be currently transmitted to the subframe. The transmitted control information may include a control channel transmission interval indicator indicating the number of OFDM symbols over which control information is transmitted, scheduling information for downlink data or uplink data, and information about HARQ ACK/NACK.

In the LTE system, the scheduling information for downlink data or uplink data is transmitted from a BS to a UE through downlink control information (DCI). The DCI is defined according to various formats, and may indicate whether it is scheduling information (UL grant) for uplink data or scheduling information (DL grant) for downlink data according to each format, whether it is a compact DCI with a small size of control information, whether spatial multiplexing using multiple antennas is applied thereto, or whether it is a DCI for power control. For example, DCI format 1, which is scheduling control information (DL grant) for downlink data, may include at least one of the following control information.

Resource allocation type 0/1 flag: This indicates whether a resource allocation scheme corresponds to type 0 or type 1. Type 0 uses a bitmap scheme to allocate resources in units of resource block group (RBG). In the LTE system, the basic unit of scheduling is an RB represented by time and frequency domain resources, and the RBG is composed of a plurality of RBs to become the basic unit of scheduling in a scheme of type 0. Type 1 allows a specific RB to be allocated within the RBG.

Resource block assignment: This indicates an RB assigned for data transmission. A resource to be represented is determined according to the system bandwidth and the resource allocation scheme.

Modulation and coding scheme (MCS): This indicates a modulation scheme used for data transmission and the size of a transport block (TB) that is data to be transmitted.

HARQ process number: This indicates a process number of HARQ.

New data indicator: This indicates whether the corresponding transmission is HARQ initial transmission or retransmission.

Redundancy version: This indicates a redundancy version of HARQ.

Transmission power control (TPC) command for physical uplink control channel (PUCCH): This indicates a transmission power control command for PUCCH, which is an uplink control channel.

The DCI may be subjected to channel coding and modulation processes and may be transmitted on a physical downlink control channel (PDCCH) that is a downlink physical control channel (or control information, hereinafter, is used interchangeably) or enhanced PDCCH (or improved control information, hereinafter, is used interchangeably). In the following, PDCCH or EPDCCH transmission and downlink control information transmission on PDCCH or EPDCCH may be understood as the same meaning, and PDSCH transmission and downlink data transmission on PDSCH may be understood as the same meaning. In addition, PUCCH transmission and uplink control information transmission on PUCCH may be understood as the same meaning, and physical uplink shared channel (PUSCH) transmission and uplink control information or uplink data transmission on PUSCH may be understood as the same meaning.

In general, the DCI is scrambled with a specific UE identifier (radio network temporary identifier (RNTI)) independently for each UE, is additionally subjected to cyclic redundancy check (CRC), is subjected to channel coding, and then is configured as an independent PDCCH to be transmitted. In the time domain, the PDCCH is mapped and transmitted during the control channel transmission interval, and the frequency domain mapping position of the PDCCH may be determined by the identifier (ID) of each UE and may be transmitted by being spread over the entire system transmission bandwidth.

The downlink data may be transmitted on a physical downlink shared channel (PDSCH) which is a physical channel for downlink data transmission. The PDSCH may be transmitted after the control channel transmission interval, and scheduling information such as a specific mapping position in the frequency domain, a modulation scheme, or the like is determined based on the DCI transmitted through the PDCCH.

Through MCS of the control information constituting the DCI, the BS notifies the UE of a modulation scheme applied to the PDSCH to be transmitted to the UE and a transport block size (TBS) to be transmitted. In the present embodiment, the MCS may be composed of 5 bits or more or fewer bits. The TBS corresponds to the size before channel coding for error correction is applied to a data transmission block to be transmitted by the BS.

The modulation scheme supported by the LTE system corresponds to quadrature phase shift keying (QPSK), 16 quadrature amplitude modulation (16QAM), and 64QAM. Each modulation order $Q_m$ corresponds to 2, 4, and 6. That is, 2 bits per symbol for QPSK modulation, 4 bits per symbol for 16QAM modulation, and 6 bits per symbol for 64QAM modulation may be transmitted. In addition, modulation schemes of 256QAM or more may be used depending on system modifications.

Figure 2:
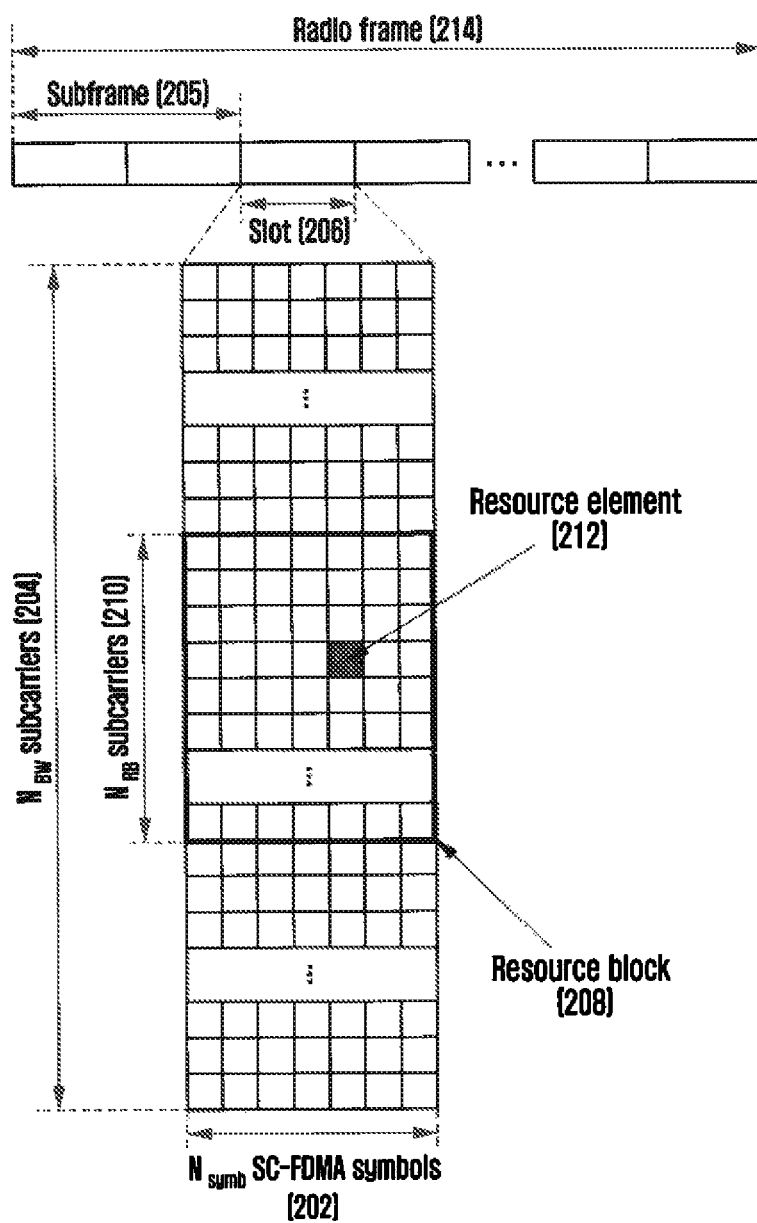
FIG. 2 is a diagram illustrating a basic structure of a time-frequency domain, which is a radio resource region in which data or control channels are transmitted in an uplink in an LTE-A system.

FIG. 2 is a diagram illustrating a basic structure of a time-frequency domain, which is a radio resource region in which data or control channels are transmitted in an uplink in an LTE-A system.

Referring to FIG. 2, the horizontal axis represents a time domain and the vertical axis represents a frequency domain. A minimum transmission unit in the time domain is an SC-FDMA symbol 202, in which $N_{symb}$ SC-FDMA symbols constitute one slot 206, and two slots constitute one subframe 205. A minimum transmission unit in the frequency domain is a subcarrier, and the entire system transmission bandwidth 204 is composed of a total of $N_{BW}$ subcarriers. The $N_{BW}$ may have a value proportional to the system transmission bandwidth.

The basic unit of a resource in a time-frequency domain may be defined as an SC-FDMA symbol index and a subcarrier index as a resource element (RE) 212. A resource block (RB) 208 may be defined as $N_{symb}$ consecutive SC-FDMA symbols in the time domain and $N_{RB}$ consecutive subcarriers in the frequency domain. Therefore, one RB is composed of $N_{symb} \times N_{RB}$ REs. In general, the minimum transmission unit of data or control information is a unit of RB. In the case of the PUCCH, it is mapped to a frequency domain corresponding to 1 RB and transmitted during one subframe.

In the LTE system, a timing relationship may be defined between a PDSCH which is a physical channel for downlink data transmission and a PDCCH including semi-persistent scheduling (SPS) release or between a PUCCH and a PUSCH which are uplink physical channels through which an HARQ ACK/NACK corresponding to an EPDDCH is transmitted. For example, in an LTE system operating with frequency division duplex (FDD), a PDSCH transmitted in an (n−4)-th subframe, a PDCCH including SPS release, or an HARQ ACK/NACK corresponding to an EPDCCH may be transmitted to the PUCCH or the PUSCH in an n-th subframe.

In the LTE system, a downlink HARQ adopts an asynchronous HARQ scheme in which data retransmission time point is not fixed. That is, when the HARQ NACK is fed back from the UE with respect to initial transmission data transmitted by the BS, the BS freely determines the transmission time of retransmission data by a scheduling operation. The UE may buffer data determined to be an error as a result of decoding received data and then may perform combining with the next retransmission data.

When receiving a PDSCH including downlink data transmitted from the BS in a subframe n, the UE transmits uplink control information including HARQ ACK or NACK of the downlink data to the BS through the PUCCH or the PUSCH in a subframe n+k. Here, k may be defined differently according to the FDD or time division duplex (TDD) of the LTE system. For example, in the FDD LTE system, the value of k is fixed to 4. Meanwhile, in the TDD LTE system, the value of k may be changed according to subframe configuration and subframe number. Also, when data is transmitted through a plurality of carriers, the value of k may be differently applied according to the TDD configuration of each carrier.

In the LTE system, unlike the downlink HARQ, an uplink HARQ adopts a synchronous HARQ scheme with a fixed data transmission time point. That is, an uplink/downlink timing relationship between a PUSCH which is a physical channel for uplink data transmission and a PDCCH which is a downlink control channel for transmitting a DCI for scheduling uplink data preceding thereto and between a physical hybrid indicator channel (PHICH) which is a physical channel through which an HARQ ACK/NACK corresponding to the PUSCH is transmitted may be determined by the following rule.

When receiving a PDCCH including uplink scheduling control information transmitted from the BS in the subframe n or a PHICH through which a downlink HARQ ACK/NACK is transmitted, the UE transmits uplink data corresponding to the control information to the subframe n+k through the PUSCH. Here, k may be defined differently according to the FDD or TDD of the LTE system. For example, in the FDD LTE system, the value of k is fixed to 4. Meanwhile, in the TDD LTE system, the value of k may be changed according to subframe configuration and subframe number. Also, when data is transmitted through a plurality of carriers, the value of k may be differently applied according to the TDD configuration of each carrier.

When the UE receives a PHICH including information related to a downlink HARQ ACK/NACK from the BS in a subframe i, the PHICH corresponds to the PUSCH transmitted to a subframe i-k by the UE. In this case, k may be defined differently according to the FDD or TDD of the LTE system and configuration thereof. For example, in the FDD LTE system, the value of k is fixed to 4. Meanwhile, in the TDD LTE system, the value of k may be changed according to subframe configuration and subframe number. Also, when data is transmitted through a plurality of carriers, the value of k may be differently applied according to the TDD configuration of each carrier.

Table 2 below describes DCI format types that can be supported according to each transmission mode under conditions set by a UE identifier (C-RNTI).

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subdause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
|  | DCI format 2B | UE specific by C-RNTI | Dual layer transmission, port 7 and 8 (see subclause 7.1.5A) or single-antenna port, port 7 or 8 (see subclause 7.1.1) |

The UE assumes that a corresponding DCI format exists in a control region interval according to a predetermined transmission mode, and performs search and decoding. For example, when the UE is instructed with transmission mode 8, the UE searches for DCI format 1A in a common search space and a UE-specific search space, and searches for DCI format 2B only in the UE-specific search space.

The above-description of the wireless communication system has been made based on the LTE system, and the disclosure is not limited to the LTE system, but may be applied to various wireless communication systems such as NR, 5G, and the like. In addition, when the disclosure is applied to another wireless communication system, the value of k may be changed and applied to even a system using a modulation scheme corresponding to FDD.

Figure 3:
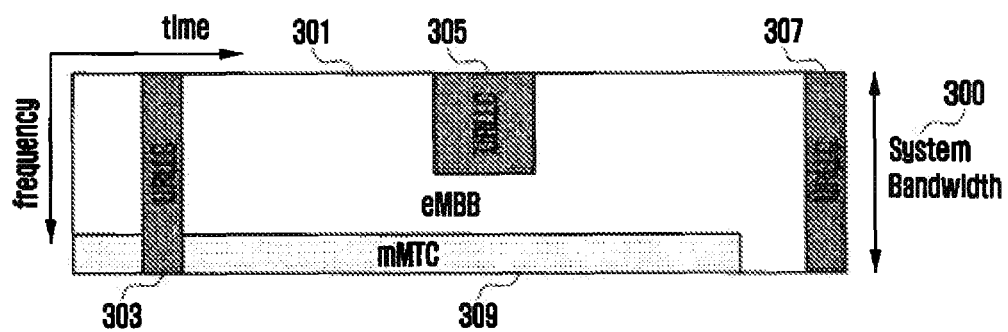
FIGS. 3 and 4 are diagrams illustrating a state in which data for eMBB, URLLC, and mMTC, which are services considered in a 5G or NR system, are allocated in frequency-time resources.
Figure 4:
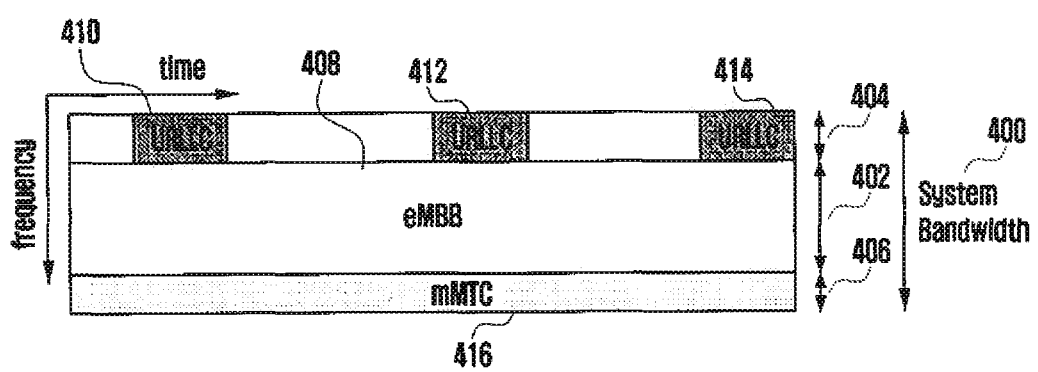

FIGS. 3 and 4 are diagrams illustrating a state in which data for eMBB, URLLC, and mMTC, which are services considered in a 5G or NR system, are allocated in frequency-time resources.

Referring to FIGS. 3 and 4, a scheme in which frequency and time resources are allocated for information transmission in each system is illustrated.

In FIG. 3, data for eMBB, URLLC, and mMTC services is allocated in the entire system frequency band 300. When a plurality of pieces of data 303, 305, and 307 for URLLC services are generated and need to be transmitted while eMBB 301 and mMTC service 309 are allocated and transmitted in a specific frequency band, a transmitter may transmit the data 303, 305, and 307 for URLLC services without emptying or transmitting portions of a corresponding resource to which the eMBB 301 and mMTC service 309 have been already allocated. Since the URLLC service is used to reduce a delay time, URLLC data 303, 305, and 307 may be allocated to a portion of a resource 301 allocated for the eMBB service and transmitted. If the URLLC service is additionally allocated and transmitted in the resource to which the eMBB service is allocated, the eMBB data may not be transmitted in an overlapping frequency-time resource, and thus the transmission performance of the eMBB data may be lowered. That is, in the above case, eMBB data transmission failure due to URLLC service allocation may occur.

In FIG. 4, the entire system frequency bandwidth 400 is divided into subbands, and the respective subbands 402, 404, and 406 may be used for transmitting data and signals according to each service. Information related to the subband configuration may be predetermined, and this information may be transmitted to a UE by a BS through higher signaling. Alternatively, a BS or a network node may arbitrarily divide subbands and may provide services to a UE without separately transmitting subband configuration information. In FIG. 4, subband 2 (402) is used for eMBB data transmission, subband 1 (404) is used for URLLC data transmission, and subband 3 (406) is used for mMTC data transmission.

Throughout the embodiment, the length of a transmission time interval used for URLLC transmission may be shorter than the length of a TTI used for eMBB or mMTC transmission. In addition, a response of information related to the URLLC may be transmitted faster than eMBB or mMTC, and thus it is possible to transmit and receive the URLLC information with a low delay.

An eMBB service described below is referred to as a first type service, and eMBB data is referred to as first type data. The first type service or the first type data is not limited to the eMBB and may also be applicable to a case where high-speed data transmission is required or broadband transmission is performed. In addition, a URLLC service is referred to as a second type service, and URLLC data is referred to as second type data. The second type service or the second type data is not limited to the URLLC, but may also be applicable to a case where a low delay time is required or high reliability transmission is required, or to other systems requiring low delay time and high reliability at the same time. In addition, an mMTC service is referred to as a third type service, and mMTC data is referred to as type 3 data. The third type service or the third type data is not limited to the mMTC, and may be applicable to a case where a low speed, a wide coverage, or a low power is required. In addition, when describing an embodiment, it may be understood that the first type service includes or does not include the third type service.

The structure of a physical layer channel used for each type to transmit the three types of services or data may be different. For example, at least one of a length of a transmission time interval (TTI), an allocation unit of frequency resources, a structure of a control channel, and a data mapping method may be different.

In the above description, three types of services and three types of data exist. However, more types of services and data corresponding thereto may exist, and in this case, the contents of the disclosure may be applied.

In order to describe the method and apparatus proposed in the embodiment, terms such as physical channels and signals in the conventional LTE or LTE-A system may be used. However, the contents of the disclosure can be applied in wireless communication systems other than LTE and LTE-A systems.

As described above, the disclosure defines the transmission/reception operation of a UE and a BS for transmitting the first type, second type, third type services or data, and proposes a specific method for operating UEs receiving different types of service or data scheduling together in the same system. In the disclosure, a first type UE, a second type UE, and a third type UE refer to UEs that have received the first type, the second type, and the third type service or data scheduling, respectively. In the disclosure, the first type UE, the second type UE, and the third type UE may be the same UE or may be different UEs.

Hereinafter, at least one of an uplink scheduling grant signal and a downlink data signal is called a first signal. In the disclosure, at least one of an uplink data signal for uplink scheduling grant and an HARQ-ACK/NACK for the downlink data signal is called a second signal. In addition, a signal that expects a response from a UE among signals transmitted to the UE by the BS may be a first signal, and a response signal of a UE corresponding to the first signal may be a second signal. The service type of the first signal may be at least one of eMBB, URLLC, and mMTC, and the second signal may also correspond to at least one of the above services.

The contents of the disclosure is applicable to FDD and TDD systems, and in the disclosure, higher signaling may be a signal transmission method in which signals are transmitted from a BS to a UE using a downlink data channel of a physical layer or signals are transmitted from a UE to a BS using an uplink data channel of a physical layer, and may be referred to as RRC signaling, PDCP signaling or MAC control element (MAC CE). According to the disclosure, in a downlink channel, a UE may be interpreted as a receiver and a BS may be interpreted as a transmitter. In an uplink channel, a UE may be interpreted as a transmitter and a BS may be interpreted as a receiver.

In addition, the downlink control channel described in the disclosure may correspond to one or more of a cell common downlink control channel, a UE common downlink control channel, and a UE-specific downlink control channel, and the downlink control information described in the disclosure may correspond to one or more of cell common downlink control information, UE common downlink control information, and UE-specific downlink control information. In addition, the higher signaling described in the disclosure may correspond to one or more of cell common higher signaling and UE-specific higher signaling, and the method described in relation to the downlink control channel or data channel (or corresponding information and data) in the disclosure is applicable to the uplink control channel or data channel (or corresponding information and data).

In addition, the transmission interval described in the disclosure may be the same as at least one of the following, which may vary depending on whether it is a corresponding service or the first, second or third type service or data transmission/reception.

Figure 5:
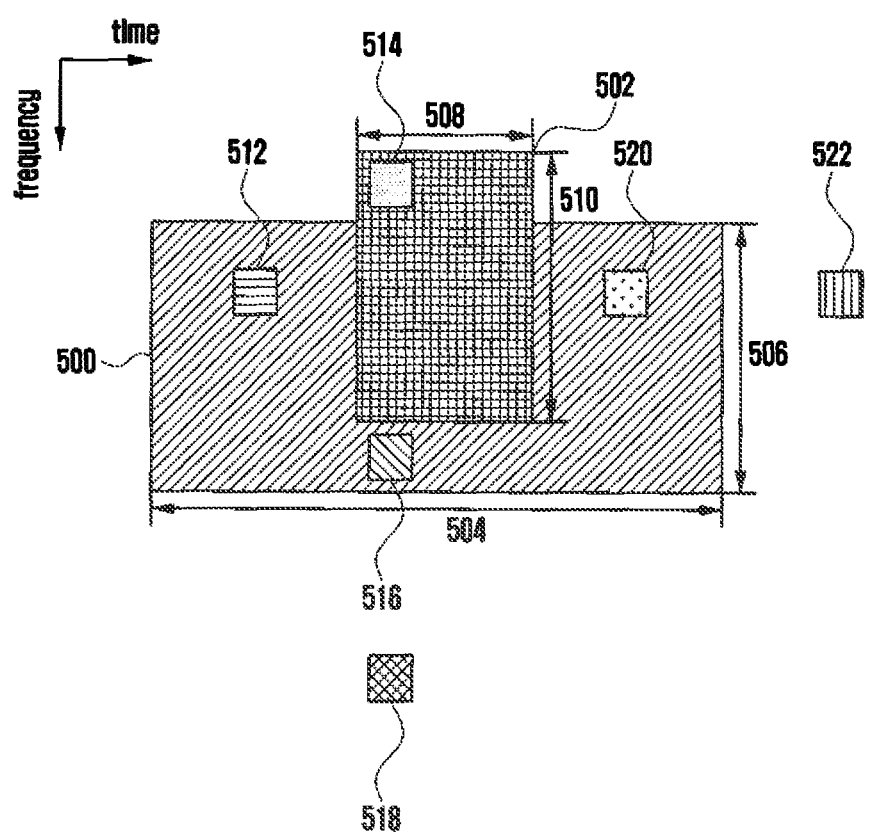
FIG. 5 is a diagram illustrating an instruction method using downlink control information when data preemption of a specific service occurs in a communication system.

Slot composed of 7 OFDM symbols
Slot composed of 14 OFDM symbols
Mini slot composed of fewer OFDM symbols than slots
Set of slots composed of more OFDM symbols than slots or set of slots and mini slots FIG. 5 is a diagram illustrating an instruction method using downlink control information when data preemption of a specific service occurs in a communication system.

In FIG. 5, a BS delivers first type data 500 to a UE for a first type service through a physical downlink data channel. A time interval 504 to which the first type data 500 is allocated is determined based on a unit in which the first type data 500 is transmitted, and the unit may be a slot composed of 7 (or 14) OFDM symbols. Alternatively, the unit may be composed of one or more OFDM symbols or one or more slots. The time interval 504 to which the first type data 500 is allocated may be continuously allocated as shown in FIG. 5, or may be discontinuously allocated unlike the case of FIG. 5. A frequency range 506 to which the first type data 500 is allocated may be equal to or smaller than a maximum frequency band that can be supported by a UE or a system maximum frequency band. The frequency range 506 to which the first type data 500 is allocated may be continuously allocated as shown in FIG. 5, or may be discontinuously allocated unlike the case of FIG. 5.

In the disclosure, the first type data 500 may also be understood as a reference signal (RS) used for channel estimation such as CSI-RS. Alternatively, a resource to which first type data is allocated may be understood as a resource allocated for channel measurement. Alternatively, the first type data may include downlink data and a reference signal transmitted for downlink channel measurement.

A BS may allocate second type data 502 to all or some of time and frequency resources in a time and frequency domain to which scheduled first type data 500 is allocated. This operation is called puncturing or preemption. Alternatively, this operation can be used interchangeably with interruption. Alternatively, it is possible to allocate the second type data 502 while avoiding the time and frequency domain to which the scheduled first type data 500 is allocated. Alternatively, it is possible to allocate the second type data 502 to all or some of the time and frequency resources in the time and frequency domain to which the two or more scheduled first type data 500 are allocated.

A time interval 508 to which the second type data 502 is allocated is determined based on a unit in which the second type data is transmitted, and the unit may be a slot composed of 7 (or 14) OFDM symbols. Alternatively, the unit may be composed of one or more OFDM symbols or one or more slots. Here, a subcarrier spacing used for the first type data 500 and a subcarrier spacing used for the second type data 502 may be the same or different. The time interval 508 to which the second type data 502 is allocated may be continuously allocated as shown in FIG. 5, or may be discontinuously allocated unlike the case of FIG. 5. A frequency range 510 to which the second type data 502 is allocated may be equal to or smaller than a maximum frequency band that can be supported by a UE or a system maximum frequency band. The frequency range 510 to which the second type data 502 is allocated may be continuously allocated as shown in FIG. 5, or may be discontinuously allocated unlike the case of FIG. 5.

An operation in which the above-describe puncturing or preemption occurs will be described with reference to FIG. 5. The time interval 508 allocated for the second type data 502 may overlap all or part of the time interval 504 allocated for the first type data 500 in terms of time, and the frequency range 510 allocated for the second type data 502 may overlap all or part of the frequency range 506 allocated for the first type data 500 in terms of frequency. When at least partially overlapping interval is generated in both the time interval and the frequency range, it is determined that the second type data 502 punctures or preempts all or part of the first type data 500.

In the case in which puncturing or preemption occurs in this manner, if there is no separate indicator information indicating whether the above-described puncturing or preemption occurs at the time of reception of the first type data 500 by a UE supporting the first type service, the UE may attempt to receive and demodulate and/or decode the first type data including a signal other than its own data, and the demodulation and/or decoding may be highly likely to fail. In addition, in the case in which the first type data 500 is retransmitted, if there is no separate indicator information indicating whether puncturing or preemption occurs, there is a high possibility of performing HARQ combining of a signal other than its own data with a received signal, and therefore it is highly likely that demodulation and decoding will fail even in retransmission. Thus, in order to efficiently transmit the first type data, it is necessary to inform the UE supporting the first type service of whether puncturing or preemption is performed through separate indicator information, and the indicator may be called a second type data generation indicator, a puncturing indicator, or a preemption indicator.

In the disclosure, conditions for a UE to perform downlink control information searching including a preemption indicator in a valid transmission interval may be the same as at least one of the following.

When UE fails to demodulate and/or decode downlink data

When UE receives downlink data scheduling through downlink control information

When UE receives a downlink reference signal (for example, a channel state information reference signal (CSI-RS), a phase tracking reference signal (PTRS), etc.) measurement instruction through downlink control information or when downlink reference signal measurement is configured by higher signaling When UE is scheduled for physical downlink data channel resource region When UE is allocated with physical downlink data channel resource region The preemption indicator may inform the UE supporting the first type service of a frequency or time resource from which the second type data is generated. The frequency or time resource indicated by the preemption indicator may be exactly equal to or greater than the frequency or time resource to which the second type data is allocated.

As a method in which the frequency resource is informed by the preemption indicator, a bitmap or LTE frequency resource allocation method of a PRB or PRB group unit may be applied as it is or modified. Alternatively, the frequency resource may be informed using the offset relative to the frequency band (or center frequency) through which a primary synchronization signal (PSS), a secondary synchronization signal (SSS), or a physical broadcast channel (PBCH) required for cell initial access is transmitted.

In addition, the preemption indicator may inform the time resource through a value indicating a previous (or later) slot on the basis of when the preemption indicator is transmitted. Alternatively, the preemption indicator may inform the time resource through a symbol range or a symbol value within a slot indicated by another value or determined in advance.

Information included in the preemption indicator may be the same as at least one of the following.

- All or part of physical downlink data channel resource region (constituted of time or frequency) that UE has received
- All or part of physical downlink data channel resource region (constituted of time or frequency) that UE is currently receiving
- All or part of physical downlink data channel resource region (constituted of time or frequency) that UE is to receive
- System frame number (SFN)
- Number of SFNs and symbols (or symbol groups) (or index)
- Number of SFNs and symbols (or symbol groups) (or index), and sub frequency band (which can be mixed with sub frequency band or subband)
- Value (or index) of valid transmission interval before (or after) transmission interval in which preemption indicator is transmitted
- Value (or index) of valid transmission interval, number of symbols (or symbol groups) (or index), and sub frequency band before (or after) transmission interval in which preemption indicator is transmitted
- Number of symbols (or symbol groups) (or index) of valid transmission interval
- Sub frequency band of valid transmission interval
- Partial sub band among carrier frequency band
- Sub frequency band among frequency bands supported by second type service
- (One or two) offset value relative to center frequency at which sync signal (SS) is transmitted
- (One or two) offset value relative to specific frequency reference value The frequency or time resource information included in the preemption indicator may be always determined in the specification in a combination of one or two or more of the above-described examples. Alternatively, whether any type of information of the above-described examples is used with higher signaling such as RRC or MAC CE may be configured. Alternatively, whether any type of information of the above-described examples is used with L1 signaling (physical layer signaling) may be configured.

The subcarrier spacing applied to the time or frequency resource indicated by the preemption indicator may be one specific value. Alternatively, the subcarrier interval applied to the time or frequency resource indicated by the preemption indicator may be a subcarrier interval of the first type data received or being received by the UE. If the subcarrier spacing of the first type data received or being received by the UE is different from the subcarrier spacing applied to the resource indicated by the preemption indicator, the UE may apply the frequency or time resource based on the subcarrier spacing applied to the resource indicated by the preemption indicator, to the frequency and time resource based on the subcarrier spacing applied to the resource to which the first type data is allocated, thereby determining that all or part of the resource region is preempted. For example, when a UE receiving data based on a subcarrier spacing of 15 kHz receives a preemption indicator indicating a resource based on a subcarrier spacing of 30 kHz, the UE may understand and apply the resource indicated by the preemption indicator based on the subcarrier spacing of 15 kHz.

If the subcarrier spacing applied to the second type data is different from the subcarrier spacing applied to the first type data, a BS may inform the UE supporting the first type service of the preemption indicator based on the subcarrier spacing applied to the first type data in the frequency and time unit of the resource indicated by the preemption indicator. Alternatively, the BS may use the frequency and time unit of the resource indicated by the preemption indicator based on the subcarrier spacing applied to the second type data. In this case, the UE supporting the first type service may recognize that the subcarrier spacing applied to the resource indicated by the preemption indicator is different from the subcarrier spacing applied to the first type data that is received or being received by the UE, and may appropriately transform and apply the recognized information.

Alternatively, the subcarrier spacing applied to the frequency and time unit of the resource indicated by the preemption indicator may be defined in the specification and used, as one of a specific subcarrier spacing, a subcarrier spacing applied to the first type data, and a subcarrier spacing applied to the second type data. Alternatively, the subcarrier spacing applied to the frequency and time unit of the resource indicated by the preemption indicator may be configured by higher signaling such as RRC, MAC, or CE or may be configured by L1 signaling.

In the disclosure, a method of configuring the preemption indicator may be at least one of the following. Whether the preemption indicator is used, the purpose of the preemption indicator, information included in the preemption indicator, or a physical control channel through which the preemption indicator is transmitted may be configured in the following manner.

- Common or UE-specific higher signaling
- Common or UE-specific L1 signaling
- Implicit indication associated with frequency band
- Implicit indication associated with subcarrier spacing
- Combination of the above-mentioned methods When the preemption indicator is configured by at least one of the above examples, the UE searches for downlink control information including the preemption indicator in the physical downlink control channel.

The preemption indicator may be included in the downlink control information or may be configured in a specific preamble sequence form. When the preemption indicator is included in the downlink control information, the downlink control information may be at least one of cell common downlink control information, UE common downlink control information, and UE-specific downlink control information. The cell common downlink control information is transmitted through a physical cell common downlink control channel, the UE common downlink control information is transmitted through a physical UE common downlink control channel, and the UE-specific downlink control information is transmitted through a physical UE-specific downlink control channel. Alternatively, the preemption indicator may be transmitted through a downlink control channel similar to the PCFICH or PHICH of the conventional LTE system. The downlink control information through which the preemption indicator is transmitted is transmitted through a physical downlink control channel preset by higher signaling. When the preemption indicator is present in the form of a sequence, the UE determines whether preemption has occurred based on whether a specific preamble sequence is detected. The frequency and time information may be included in the sequence information.

When receiving downlink control information scrambled with a specific UE identifier (RNTI) associated with the preemption indicator through a (UE common or UE-specific) downlink control channel, the UE may determine that the corresponding control information includes preemption indicator information.

In addition, the UE may or may not perform downlink control information searching including the preemption indicator information by (group common or UE-specific) higher signaling or (group common or UE-specific) L1 signaling. Alternatively, the UE may or may not perform downlink control information searching including the preemption indicator according to the frequency band. Alternatively, the UE may or may not perform downlink control information searching including the preemption indicator according to a specific time (for example, a specific slot number or an uplink dedicated slot or uplink center slot). Alternatively, the UE may or may not perform downlink control information searching including the preemption indicator according to the service type (e.g., whether to support the first, second, and third type services).

FIG. 5 illustrates the positions of possible preemption indicators together. According to FIG. 5, a total of six possible preemption indicator candidates 512, 514, 516, 518, 520, and 522 are shown. The BS may inform the UE using the first service of the preemption information by simultaneously using one or two or more of the six preemption indicator candidates. The following describes the characteristics of each of the six preemption indicators.

1. The preemption indicator 512 is included in downlink control information and transmitted to a UE for the first type service before actual preemption occurs. The downlink control channel through which the physical downlink control information is transmitted is previously configured by higher signaling. The preemption indicator 512 includes specific time interval (or frequency range) information after a time at which the corresponding indicator is transmitted. The above operation can be applied in the same manner as an indicator for indicating a reserved resource for a future service.

2. The preemption indicator 514 is included in downlink control information while the actual preemption occurs and transmitted to a UE for the first type service. The physical downlink control channel through which the downlink control information is transmitted is previously configured by higher signaling. The preemption indicator 514 is included in the resource region to which the second type data is allocated, and the second type data is allocated while avoiding the resource region to which the downlink control information including the preemption indicator is allocated. The preemption indicator 514 may include specific time interval (or frequency range) information including a time point at which the corresponding indicator is transmitted, or the time interval information may be omitted.

3. The preemption indicator 516 is included in the downlink control information while the actual preemption occurs and transmitted to the UE for the first type service. The physical downlink control channel through which the downlink control information is transmitted is previously configured by higher signaling. The preemption indicator 516 is included in the resource region to which the first type data is allocated, and the first type data is allocated while avoiding the resource region to which the downlink control information including the preemption indicator is allocated. The preemption indicator 516 may include specific time interval (or frequency range) information including a time point at which the corresponding indicator is transmitted, or the time interval information may be omitted.

4. The preemption indicator 518 is included in the downlink control information and transmitted to the UE for the first type service while the actual preemption occurs. The physical downlink control channel through which the downlink control information is transmitted is previously configured by higher signaling. The preemption indicator 518 is included outside the resource region to which the first type data is allocated. The preemption indicator 518 may include specific time interval (or frequency range) information including a time point at which the corresponding indicator is transmitted, or the time interval information may be omitted.

5. The preemption indicator 520 is included in the downlink control information after the actual preemption occurs and transmitted to the UE for the first type service. The physical downlink control channel through which the downlink control information is transmitted is previously configured by higher signaling. The preemption indicator 520 is included in the time interval 504 in which the first type data is transmitted. The preemption indicator 520 includes specific time interval (or frequency range) information before a time point at which the corresponding indicator is transmitted.

6. The preemption indicator 522 is included in the downlink control information after the actual preemption occurs and transmitted to the UE for the first type service. The physical downlink control channel through which the downlink control information is transmitted is previously configured by higher signaling. The preemption indicator 522 is not included in the time interval 504 in which the first type data is transmitted. The preemption indicator 522 includes specific time interval (or including frequency range) information before a time point at which the corresponding indicator is transmitted.

The BS may transmit the preemption indicator to the UE through at least one of the six physical downlink control channels through which the downlink control information including the preemption indicator is transmitted, and the UE supporting the first service searches for at least one of the total of six candidates.

The operation of the UE can be described as follows. The UE searches for the physical downlink control channel through which the downlink control information including the preemption indicator is transmitted. Here, the preemption indicator indicates whether the reception (frequency or time) interval of the corresponding first type data is preempted during the reception of the first type data, after the completion of the reception, or before the start of the reception.

Alternatively, the UE does not search for the physical downlink control channel through which the downlink control information including the preemption indicator is transmitted. Here, the preemption indicator indicates whether the reception (frequency or time) interval of the corresponding first type data is preempted during the reception of the first type data, or before the start of the reception.

Alternatively, the UE does not search for the physical downlink control channel through which the downlink control information including the preemption indicator is transmitted. Here, the preemption indicator indicates whether the reception (frequency or time) interval of the corresponding first type data is preempted when the first type data is not scheduled.

Alternatively, the UE searches for the physical downlink control channel through which the downlink control information including the preemption indicator is transmitted. Here, the preemption indicator indicates whether the reception (frequency or time) interval of the corresponding first type data is preempted after demodulation and/or decoding on the first type data fails.

Alternatively, the UE searches for the physical downlink control channel through which the downlink control information including the preemption indicator is transmitted. Here, the preemption indicator indicates whether a downlink data resource (or channel measurement resource) region which has been subjected to downlink scheduling is preempted. The downlink data resource or channel measurement resource may be the first type data.

Alternatively, the UE does not search for the physical downlink control channel through which the downlink control information including the preemption indicator is transmitted. Here, the preemption indicator indicates whether a downlink data resource (or channel measurement resource) region which has not been subjected to downlink scheduling is preempted. The downlink data resource or channel measurement resource may be the first type data.

Alternatively, the UE searches for a valid physical downlink control channel through which the downlink control information including the preemption indicator is transmitted. Here, the preemption indicator indicates whether a valid downlink data resource (or channel measurement resource) region which has been subjected to downlink scheduling is preempted. The downlink data resource or the channel measurement resource may be the first type data.

Alternatively, the UE does not search for the valid physical downlink control channel through which the downlink control information including the preemption indicator is transmitted. Here, the preemption indicator indicates whether the valid downlink data resource (or channel measurement resource) region which has not been subjected to downlink scheduling is preempted. The downlink data resource or the channel measurement resource may be the first type data.

The examples of a method in which the UE does not search for the downlink control information in the disclosure may be the same as at least one of the following.

Blind decoding on a control information format including the downlink control information is not performed.

Blind decoding is not performed using a specific RNTI scrambled to downlink control information.

Control information searching is not performed on a physical downlink control channel resource region configured to transmit the downlink control information.

If the UE succeeds in receiving preemption indicator information included in the downlink control information through the valid downlink control channel, the UE determines that the frequency or time resource within a specific slot indicated by the preemption indicator is preempted. At this time, the UE discards both code blocks which at least partially overlap the frequency or time resource (from the physical downlink data channel resource region) within the specific slot indicated by the preemption indicator and data before the decoding which at least partially overlaps the same from a UE buffer (that is, does not store the same in the buffer). Alternatively, the terminal does not perform HARQ combining with code blocks that are retransmitted at least partially with frequency or time resources (in the physical downlink data channel resource region) indicated by the preemption indicator. Alternatively, the UE discards the code blocks that have failed to demodulated and/or decoded among code blocks which at least partially overlap the frequency or time resource (from the physical downlink data channel resource region) within the specific slot indicated by the preemption indicator, from the UE buffer (does not store the same in the buffer). Alternatively, the UE does not perform HARQ combining on the code blocks that have failed to demodulated and/or decoded among code blocks which at least partially overlap the frequency or time resource (from the physical downlink data channel resource region) within the specific slot indicated by the preemption indicator with the code blocks which are retransmitted thereafter. Alternatively, the UE does not use a predetermined physical downlink data channel resource region corresponding to the (time or frequency) resource region indicated by the preemption indicator for demodulation and/or decoding (or HARQ combining). Alternatively, the UE discards (or does not measure) a downlink reference signal measurement value corresponding to the (time or frequency) resource region indicated by the preemption indicator, or does not report the downlink reference signal measurement value to the BS.

For example, the BS may inform the UE of preemption information of the transmission interval after or before the transmission interval (e.g., slot) in which the preemption indicator is transmitted, through transmission interval indicator information included in the preemption indicator information. For example, when 3 bits are used as the transmission interval indicator included in the preemption indicator, a total of eight pieces of information may be used to inform an n-th transmission interval indicated by the preemption indicator based on the transmission interval in which the preemption indicator is currently transmitted. Specifically, when the preemption indicator informs the preemption information of the previous transmission interval, 000 indicates a current transmission interval, 001 indicates a previous transmission interval, and 010 indicates a transmission interval immediately before a second transmission interval. Alternatively, if one bit is added to the preemption indicator or one bit of the existing bits is zero, this means the previous transmission interval, and if one bit of the existing bits is 1, this means the next transmission interval, and vice versa.

Alternatively, it is also possible to previously configure a specific transmission interval indicated by the preemption indicator by higher signaling, L1 signaling, or implicitly. In more detail, it is possible to restrict the range of the transmission interval that can be indicated by the preemption indicator according to the transmission period of the downlink control channel through which the downlink control information including the preemption indicator information is transmitted. For example, when the transmission period corresponds to every transmission interval, the transmission interval indicated by the preemption indicator information may be a transmission interval immediately before the transmission interval in which the preemption indicator information is transmitted. Alternatively, when the transmission period of the preemption indicator corresponds to two transmission intervals, the transmission interval indicated by the preemption indicator information may be the transmission interval immediately before the transmission interval in which the preemption indicator information is transmitted and a second transmission interval immediately before the transmission interval.

If the preemption indicator indicates a specific transmission interval based on the transmission interval (e.g., a slot) in which the preemption indicator itself is transmitted or indicates a specific transmission interval by higher signaling, L1 signaling, or implicitly, information indicating the frequency or time resource existing within the corresponding transmission interval may be additionally included in the preemption indicator. The time resource (e.g., an OFDM symbol value or the number of OFDM symbols) existing within the transmission interval may be indicated using a bitmap scheme or a specific rule in order to indicate the time resource, and the frequency resource existing within the transmission interval may be indicated using an offset value(s) based on a PRB index or a center frequency (the center of the frequency band in which PSS, SSS, and PBCH used for initial access are transmitted or the boundary value) in order to indicate the frequency resource.

For example, the BS may include information indicating only a specific transmission interval (for example, a slot) in the preemption indicator to transmit the corresponding information to the UE. When the UE is allocated with a physical downlink data channel resource corresponding to the indicated specific transmission interval by the BS, the UE discards the code blocks that has failed to be demodulated and/or decoded from the buffer (that is, does not store the same in the buffer), or discards all of the data channel resources from the buffer (that is, does not store the same in the buffer).

First Embodiment

Figure 6:
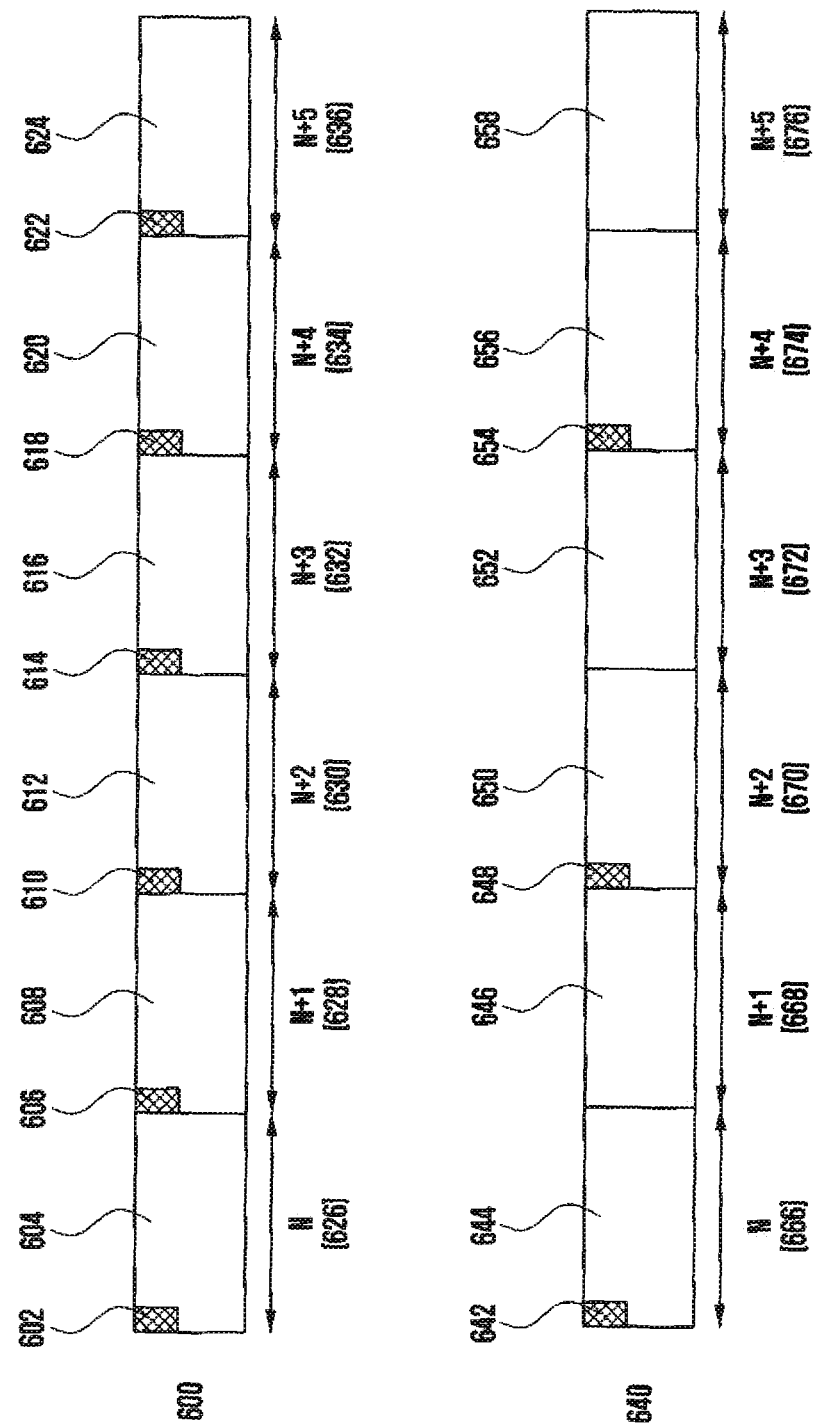
FIG. 6 is a diagram illustrating a first embodiment.

FIG. 6 is a diagram illustrating a first embodiment.

According to FIG. 6, both a first structure 600 and a second structure 640 take an FDD situation into account. A BS may transmit downlink control information, downlink data information, or downlink reference signal information to a UE for each of downlink transmission intervals 604, 608, 612, 616, 620, 624, 644, 646, 650, 652, 656, and 658. In addition, a resource for the second type data may preempt all or some of a physical downlink data resource or a downlink reference signal resource which have been scheduled for each of the downlink transmission intervals.

The transmission interval may be a slot constituted of 7 or 14 OFDM symbols. Alternatively, the transmission interval can be considered in units of mini slots, and the mini slot may be constituted of one or two or more OFDM symbols. Alternatively, the unit of the transmission interval may be a set of slots constituted of one or two or more slots.

When preemption occurs, downlink control information including preemption indicator information indicating a time or frequency resource region in which the preemption occurs is transmitted to the UE through UE-specific or group common physical downlink control channels 602, 606, 610, 614, 618, 622, 642, 648, and 654.

When the downlink data 604 or the downlink reference signal 604 transmitted in an N-th transmission interval 626 in the first structure 600 is preempted, the downlink control information including the preemption indicator may be transmitted in the (group UE common or UE-specific) physical downlink control channel of the next (N+m)-th transmission interval. In this case, if m is 1, the downlink control information including the preemption indicator may be 606.

The value of m may be an arbitrary integer value or the value of m may be a transmission interval value immediately before the corresponding UE performs uplink transmission such as HARQ-ACK feedback or channel measurement report. For example, if the UE performs HARQ-ACK feedback or channel measurement report in an (N+4)-th transmission interval, m may be 3. Alternatively, the value of m may be a transmission interval value immediately before performing downlink data or reference signal retransmission with respect to the corresponding UE.

Alternatively, in the first structure, when downlink data 604 or downlink reference signal 604 transmitted in the N-th transmission interval 626 is preempted, downlink control information including the corresponding preemption indicator can be transmitted in the (group UE common or UE-specific) physical downlink control channel from the next (N+1)-th transmission interval to an (N+k)-th transmission interval. The value of k may be a transmission interval value immediately before the corresponding UE performs uplink transmission such as HARQ-ACK feedback or channel measurement report, or the value of k may be a transmission interval value immediately before performing downlink data or reference signal retransmission or the like with respect to the corresponding UE.

The preemption indicator may be composed of a field indicating a specific transmission interval, a field indicating a specific OFDM symbol(s) within the transmission interval, or a combination thereof.

The preemption indicator information may be composed of a field indicating a specific transmission interval, a field indicating a specific OFDM symbol(s) within the transmission interval, or a combination thereof.

Alternatively, in the first structure 600, the BS informs the UE of preemption information (of frequency or time unit resource) corresponding to the transmission intervals 626, 628, 630, 632, and 634 immediately before the transmission intervals 628, 630, 632, 634, and 636 in which the preemption indicator is transmitted, using the preemption indicator included in the downlink control information transmitted in the physical downlink control channels 606, 610, 614, 618, and 622. The preemption information is composed in units of specific symbol(s) within the already indicated transmission interval.

Alternatively, in the first structure 600, the BS informs the UE of preemption information (or the frequency or time unit resource) corresponding to a g-th previous transmission interval of the transmission intervals 628, 630, 632, 634, 636 in which the preemption indicator is transmitted, using the preemption indicators included in the downlink control information transmitted in the physical downlink control channels 606, 610, 614, 618, and 622. The value of g may be an arbitrary integer value. The preemption information is composed in units of specific symbol(s) within the already indicated transmission interval.

In the second structure 640, when the downlink data 644 or the downlink reference signal 644 (or the downlink data 646 or the downlink reference signal 646) transmitted in the N-th transmission interval 666 (or in the (N+1)-th transmission interval 668) is preempted, the BS transmits the downlink control information including the preemption indicator to the UE in the valid and predetermined physical downlink control channel 648 after the preemption occurs.

In the second structure 640, the BS informs the UE of preemption information (of the frequency or time unit resource) corresponding to two transmission intervals 666 to 668 or 670 to 672 immediately before the transmission intervals 670 and 674 in which the preemption indicator is transmitted, using the preemption indicator included in the downlink control information transmitted in the physical downlink control channels 648 and 654. The preemption information is composed of a specific transmission interval value within the already indicated transmission interval(s) or a specific symbol value(s), or a combination thereof.

In an arbitrary structure, the BS informs the UE of preemption information (of the frequency or time unit resource) corresponding to b transmission intervals before (or after) an a-th transmission interval of the transmission intervals in which the preemption indicator is transmitted, using the preemption indicator included in the downlink control information transmitted in the physical downlink control channel. For example, when the preemption indicator information is transmitted in the n-th transmission interval, the preemption information includes whether an n−a−(b−1) to (n−a)-th transmission interval(s) are preempted. The values of a and b are integers. The preemption information includes the values of a and b, the values of symbol(s) within a specific transmission interval, or a combination thereof.

Figure 7:
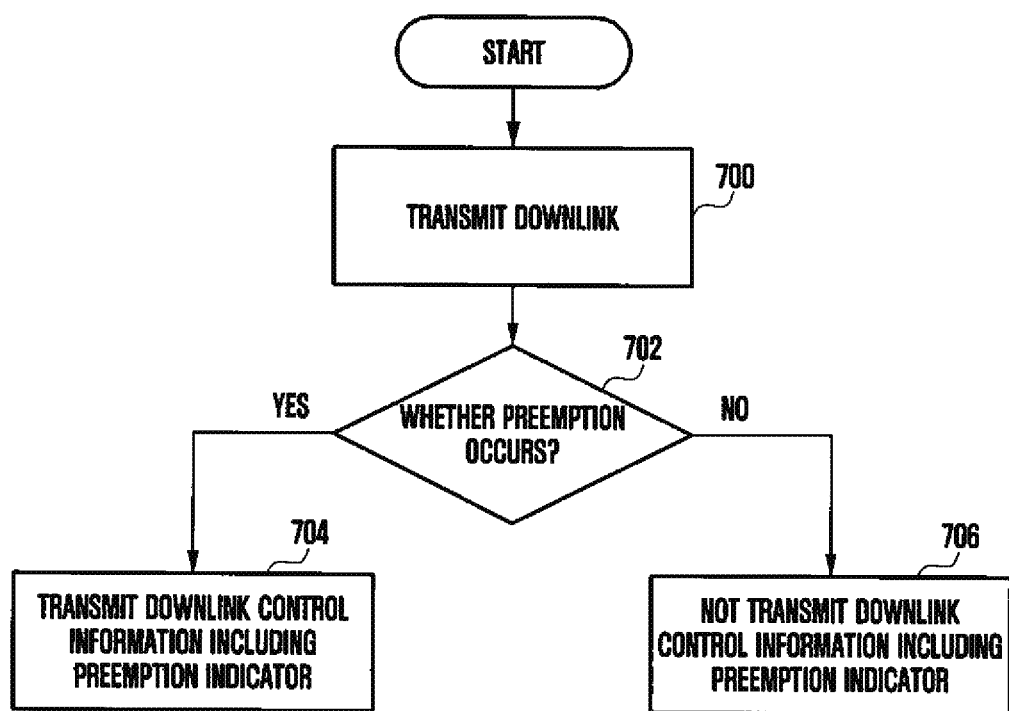
FIG. 7 is a flowchart illustrating the operation of a base station (BS) according to a first embodiment.

FIG. 7 is a flowchart illustrating the operation of a BS according to a first embodiment.

In FIG. 7, in operation 700, a BS performs downlink transmission. The downlink transmission includes all kinds of transmissions to a UE in the downlink. For example, the downlink transmission may include first type data, third type data, reference signals, or control information. In operation 702, the BS determines whether all or some of previously scheduled physical downlink transmission resources are preempted by second type data.

When the preemption occurs, in operation 704, the BS transmits downlink control information including a preemption indicator to a UE in a predetermined physical downlink control channel. Alternatively, in operation 704, the BS transmits the downlink control information including the preemption indicator to the UE in a physical downlink control channel existing before receiving a report for a HARQ-ACK feedback (or a channel measurement result) from a UE supporting a first type service affected by the preemption among predetermined physical downlink control channels. Alternatively, in operation 704, the BS transmits the downlink control information including the preemption indicator information to the UE in the physical downlink control channel existing before retransmitting the first type data to the UE supporting the first type service affected by the preemption among the predetermined physical downlink control channels. Alternatively, in operation 704, the BS transmits the downlink control information including the preemption indicator to the UE in the physical downlink control channel existing within an n-th slot (or symbol) after the preemption occurs among the predetermined physical downlink control channels.

When the preemption does not occur, in operation 706, the BS does not transmit the downlink control information including the preemption indicator to the UE in the predetermined physical downlink control channel. Alternatively, in operation 706, the BS does not transmit the downlink control information including the preemption indicator to the UE in the physical downlink control channel existing before receiving the report for the HARQ-ACK feedback (or channel measurement result) from the UE supporting the first type service affected by the preemption among the predetermined physical downlink control channels. Alternatively, in operation 706, the BS does not transmit the downlink control information including the preemption indicator to the UE in the physical downlink control channel existing before retransmitting the first type data to the UE supporting the first type service affected by the preemption among the predetermined physical downlink control channels. Alternatively, in operation 706, the BS does not transmit the downlink control information including the preemption indicator to the UE in the physical downlink control channel existing within an n-th slot (or symbol) after the preemption occurs among the predetermined physical downlink control channels.

Figure 8:
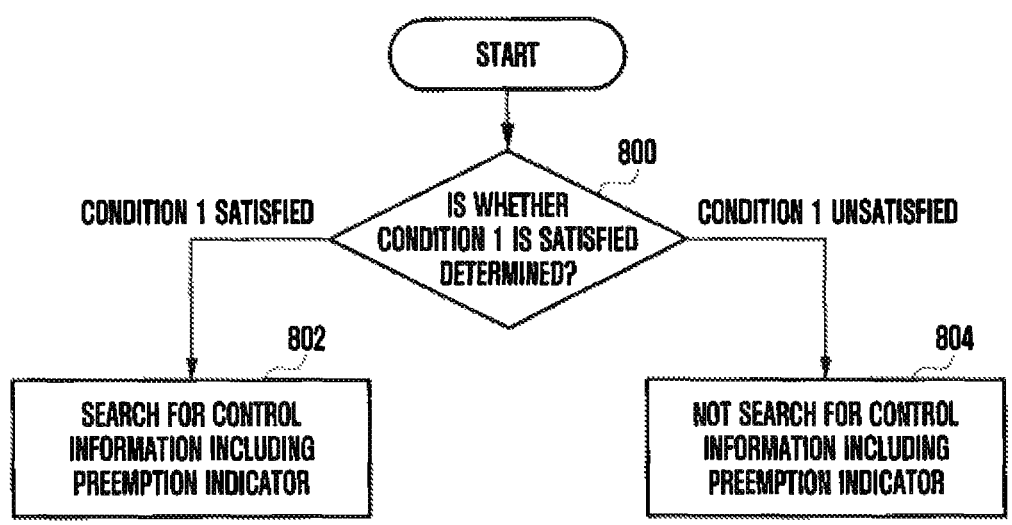
FIG. 8 is a flowchart illustrating the operation of user equipment (UE) according to a first embodiment.

FIG. 8 is a flowchart illustrating the operation of a UE according to a first embodiment.

In FIG. 8, in operation 800, a UE determines whether at least one of conditions concerning whether downlink data is scheduled to the UE and whether the UE needs to measure a downlink reference signal is satisfied.

In operation 802, when the at least one of the conditions is satisfied (condition 1 is satisfied), the UE searches for downlink control information including a preemption indicator. A physical downlink control channel through which the downlink control information including the preemption indicator is transmitted is configured in advance by higher signaling. When the downlink data is scheduled, in operation 802, the UE searches for the downlink control information in a predetermined physical downlink control channel before an HARQ-ACK feedback for data is reported. Alternatively, when the downlink data is scheduled, in operation 802, the UE searches for the downlink control information in the predetermined physical downlink control channel before retransmission of the corresponding downlink data is received. Alternatively, when downlink reference signal measurement is configured, in operation 802, the UE searches for the downlink control information in the predetermined physical downlink control channel before the corresponding reference signal measurement result is reported.

Alternatively, when the downlink data is scheduled or the downlink reference signal measurement is configured, in operation 802, the UE performs the downlink control information searching once or more in the predetermined physical downlink control channel existing within a valid downlink slot after the immediately next slot (or the next n-th slot) or the immediately next symbol (or the next n-th symbol). Alternatively, when the downlink data is scheduled or the downlink reference signal measurement is configured, in operation 802, the UE performs the downlink control information searching in the predetermined physical downlink control channel existing within the n-th slot (or symbol) after the reception of the corresponding data or the measurement of the reference signal. Alternatively, when the downlink data is scheduled or the downlink reference signal measurement is configured, in operation 802, the UE performs the downlink control information searching in the physical downlink control channel in which the preemption indicator including the preemption information corresponding to the reception of the corresponding data or a reference signal measurement time interval is transmitted.

Alternatively, the UE may determine only one of two conditions of the condition 1. For example, it may be determined that the condition 1 is satisfied when the UE receives downlink data and the condition 1 is not satisfied when the UE does not receive the downlink data. Alternatively, it may be determined that the condition 1 is satisfied when the UE is configured to measure a downlink reference signal and the condition 1 is not satisfied when the UE is not configured to measure the downlink reference signal.

When the condition 1 is not satisfied, in operation 804, the UE does not search for downlink control information including the preemption indicator. A physical downlink control channel for searching for the downlink control information including the preemption indicator is previously configured by higher signaling. In a case in which the downlink data is not scheduled (i.e., the downlink data is not received), when the downlink data is received, in operation 804, the UE does not search for the downlink control information in a predetermined physical downlink control channel until the time when an HARQ-ACK feedback for the corresponding data needs to be reported. Alternatively, if the UE receives the downlink data and feeds back the NACK, in operation 804, the UE does not search for the downlink control information in the predetermined physical downlink control channel until the time when the retransmission of the corresponding downlink data is required to be received. Alternatively, in a case in which downlink reference signal measurement is not configured, in operation 804, when the reference signal measurement is configured in the UE, the UE does not search for the downlink control information in the predetermined physical downlink control channel until the time when the corresponding measurement result is required to be reported.

Alternatively, if the downlink data is not received or the downlink reference signal measurement is not configured, in operation 804, the UE does not search for the downlink control information once or more in the predetermined physical downlink control channel existing within a valid downlink slot after the immediately next slot (or next n-th slot) or the immediately next symbol (or next n-th symbol).

Alternatively, if the UE does not receive the downlink data or the downlink reference signal measurement is not configured, in operation 804, the UE does not search for the downlink control information in the predetermined physical downlink control channel existing within the n-th slot (or symbol) after the time when the corresponding data reception or reference signal measurement is required to be performed. Alternatively, if the UE does not receive the downlink data (or the downlink reference signal measurement is not configured), in operation 804, the UE does not search for the downlink control information in the physical downlink control channel through which a preemption indicator including preemption information corresponding to a time interval in which the corresponding data reception or the reference signal measurement is required to be performed is transmitted.

Second Embodiment

Figure 9:
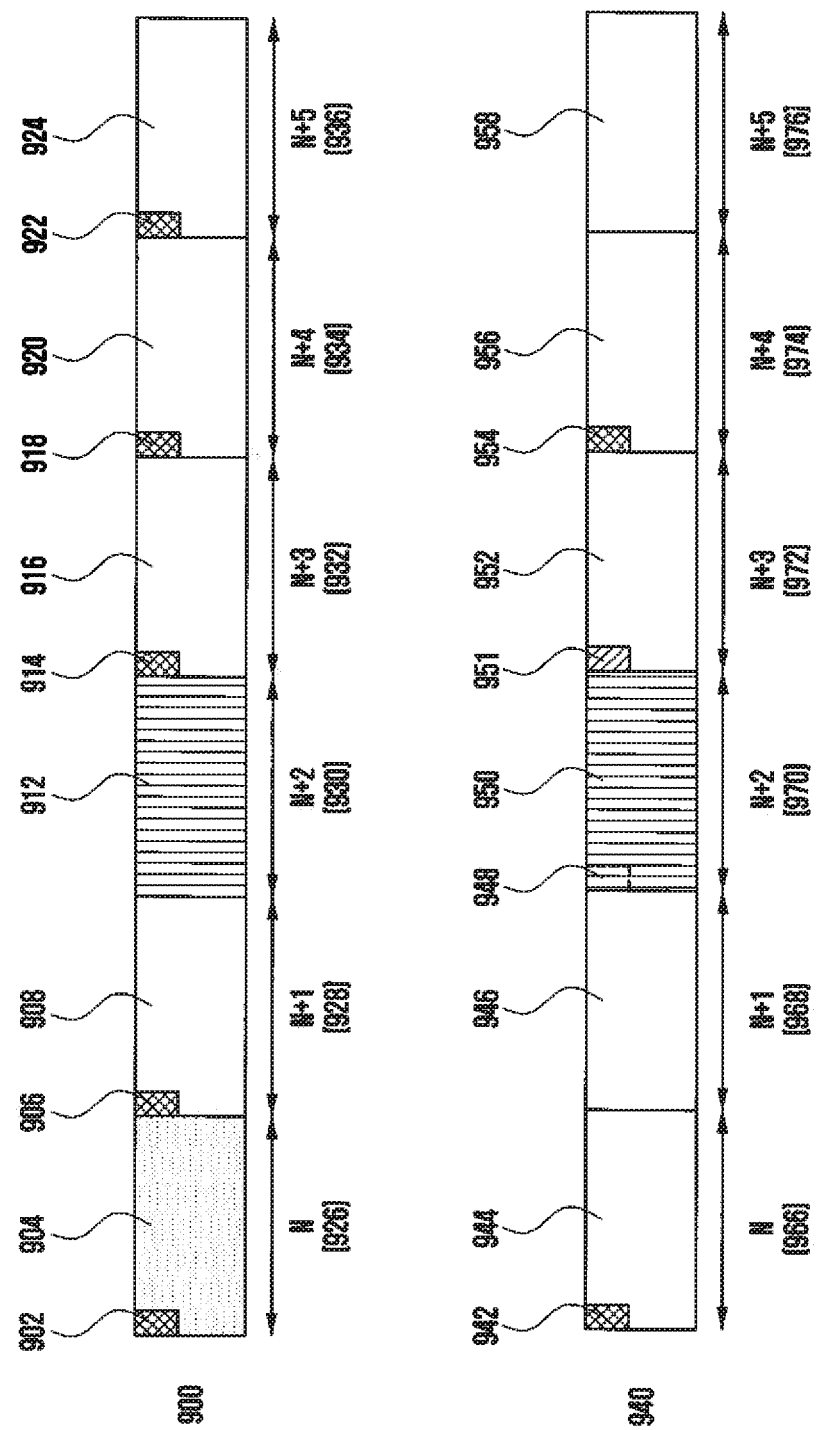
FIG. 9 is a diagram illustrating a second embodiment.

FIG. 9 is a diagram illustrating a second embodiment.

In FIG. 9, a BS may utilize transmission intervals dedicated to uplink or downlink or in a combination of downlink and uplink for each of transmission intervals 926, 928, 930, 932, 934, 936, 966, 968, 970, 972, 974, and 976 based on a TDD.

The uplink dedicated transmission interval means a case where all OFDM symbols constituting the transmission interval are configured by uplink. The downlink dedicated transmission interval means that all OFDM symbols constituting the transmission interval are configured by downlink. The transmission interval configured in the combination of uplink and downlink is included in one of an uplink-centered transmission interval or a downlink-centered transmission interval, or one of uplink and downlink transmission intervals (hereinafter, referred to as uplink/downlink transmission intervals). The uplink-centered transmission interval refers to a transmission interval in which the number of symbols utilized by uplink among the symbols constituting the transmission interval is larger by a predetermined number than the number of symbols utilized by downlink. The downlink-centered transmission interval refers to a transmission interval in which the number of symbols utilized by uplink among the symbols constituting the transmission interval is smaller by a predetermined number than the number of symbols utilized by downlink. In addition, the transmission intervals in all cases are included in the uplink/downlink transmission interval.

An example of a valid (uplink or downlink) transmission interval described in the disclosure may be one or more of the following.

When all symbols constituting the transmission interval as the valid downlink interval are downlink symbols or when symbols equal to or larger than (or equal to or smaller than) a predetermined threshold value are downlink symbols When all symbols constituting the transmission interval as the valid uplink interval are uplink symbols or when symbols equal to or larger than (or equal to or smaller than) a predetermined threshold value are uplink symbols Transmission interval in which at least physical downlink data channel resources exist as a valid downlink transmission interval An example of an invalid (uplink or downlink) transmission interval described in the disclosure may be one or more of the following.

Transmission interval in which all symbols constituting the transmission interval are downlink symbols as the invalid uplink transmission interval, transmission interval in which symbols equal to or larger than (or equal to or smaller than) a predetermined threshold value among the symbols constituting the transmission interval are downlink symbols, transmission interval in which only the physical downlink control channel resource exists, or transmission interval in which the physical downlink data channel resource does not exist Transmission interval in which all symbols constituting the transmission interval are uplink symbols as the invalid downlink transmission interval, transmission interval in which symbols equal to or larger than (or equal to or smaller than) a predetermined threshold value among the symbols constituting the transmission interval are uplink symbols, transmission interval in which only the physical uplink control channel resource exists, or transmission interval in which only the physical uplink data channel resource exists The BS may perform preemption for second type data in the transmission intervals of the remaining combinations except at least the uplink dedicated transmission interval. Alternatively, the BS may perform preemption for the second type data in the transmission intervals of all the above possible combinations. Alternatively, the BS may perform preemption for the second type data in the remaining transmission intervals except the uplink dedicated transmission interval and the uplink-centered transmission interval.

The unit of the transmission interval may be a slot composed of 7 or 14 OFDM symbols. Alternatively, the unit of the transmission interval may be a mini slot constituted of one or two or more OFDM symbols. Alternatively, the unit of the transmission interval may be the slot set constituted of one or two or more slots.

The physical downlink control channel through which the downlink control information including the preemption indicator is transmitted may be previously configured by (UE common or UE-specific) higher signaling.

In addition, the BS may dynamically transmit transmission interval format indicator information to the UE through downlink control information of a physical UE common control channel for each transmission interval. The BS informs UEs receiving the corresponding transmission interval format indicator of the transmission structure that one or more transmission intervals will have in the future through the transmission interval format indicator. For example, the transmission interval format indicator information may be slot format indicator information, and the BS may inform the UE of the configuration that the slot formats of one or two or more slots will have in the future through the slot format indicator.

For example, when the BS informs UE groups that an N-th transmission interval 926 is an uplink-centered transmission interval 904 by the transmission interval format indicator in a first transmission structure 900, there is no probability of preemption in the corresponding interval. Therefore, even if the fact that the downlink control information including the preemption indicator indicating whether the N-th transmission interval in the downlink control channel 906 is preempted is transmitted is previously configured by higher signaling, the preemption indicator is not transmitted in this situation.

As another example, when the BS informs the UE groups that an (N+2)-th transmission interval 926 is the uplink dedicated transmission interval 904 by the transmission interval format indicator in the first transmission structure 900, there is no probability of preemption in the corresponding interval. Thus, even if the fact that the downlink control information including the preemption indicator in the (N+2)-th transmission interval 926 is transmitted through the downlink control channel is previously configured by higher signaling, the corresponding transmission interval 926 has already been configured by the transmission interval format indicator as the uplink dedicated transmission interval 912, and therefore the downlink control information including the preemption indicator is not transmitted. Thus, when the fact that the downlink control information including the preemption indicator is transmitted to the (N+1)-th transmission interval 928 through the downlink control channel of the (N+2)-th transmission interval 930 is configured by higher signaling, the configuration of the (N+2)-th transmission interval 930 is changed to the uplink dedicated transmission interval by the transmission interval indicator, and therefore the BS transmits the downlink control information including the preemption information for the (N+1)-th transmission interval to the UE in an (N+3)-th transmission interval 932 thereafter.

The BS transmits downlink control information including preemption information for a y-th transmission interval to the UE through a (UE common or UE-specific) predetermined downlink control channel of an (N+n)-th valid downlink transmission interval. Here, the values of y and n are arbitrary integer values, and the valid downlink transmission interval may refer to the remaining transmission intervals except the uplink dedicated transmission interval. Alternatively, the BS transmits, to the UE, downlink control information including preemption information for the most recent valid (y−n)-th a downlink interval(s) through a (UE common or UE-specific) predetermined downlink control channel of the y-th downlink transmission interval. The values of y, a, and n are arbitrary integer values, and the valid downlink transmission interval may refer to the remaining transmission intervals except the uplink-centered transmission interval or the uplink dedicated transmission interval. For example, the most recent valid one downlink transmission interval of the (N+3)-th valid downlink transmission interval 932 is the (N+1)-th transmission interval 928. As to the most recent valid one downlink transmission interval of an (N+5)-th valid downlink transmission interval 936, the most recent valid three downlink transmission intervals are the (N+1)-th transmission interval 928, the (N+3)-th transmission interval 932, and the (N+4)-th transmission interval 934.

The UE receives, from the BS, the downlink control information including the preemption information for the y-th transmission interval through a (UE common or UE-specific) predetermined downlink control channel of the (N+n)-th valid downlink transmission interval. The values of y and n are arbitrary integer values, and the valid downlink transmission interval may refer to the remaining transmission intervals except the uplink dedicated transmission interval. Alternatively, the UE receives, from the BS, downlink control information including preemption information for the most recent valid (y−n)-th a downlink transmission interval(s) through the (UE common or UE-specific) predetermined downlink control channel of the y-th downlink transmission interval. The values of y, a, and n are arbitrary integer values, and the valid downlink transmission interval may refer to the remaining transmission intervals except the uplink-centered transmission interval or the uplink dedicated transmission interval.

For example, in a case in which the downlink control information including the preemption indicator is previously configured by higher signaling so as to be transmitted to the UE through the downlink control channel 948 in the (N+2)-th transmission interval 970 of a second transmission structure 940, when the (N+2)-th transmission interval 970 is used as the uplink dedicated transmission interval 950 by a transmission interval indicator included in a dynamically indicated UE common control channel, the downlink control information previously configured by higher signaling may not be transmitted to the UE in the downlink control channel 948.

At this time, when the transmission interval indicated by the preemption indicator included in the downlink control information transmitted to the UE through the downlink control channel of the (N+2)-th transmission interval 970 is the N-th transmission interval 966 or the (N+1)-th transmission interval 968, and preemption occurs in the N-th transmission interval 966 or the (N+1)-th transmission interval 968, the downlink control information including the preemption indicator indicating the time or frequency resource region in which the preemption occurs may be transmitted in the next transmission interval. The preemption indicator may be the downlink control channel 951 (which is implicitly fixed or fixed with specific explicit signaling) of the (N+3)-th transmission interval 972 (which is not previously configured by higher signaling) or the downlink control channel 954 of the (N+4)-th transmission interval 974 (which is previously configured by higher signaling). That is, if the transmission interval for transmitting the preemption indicator by higher signaling is indicated by the transmission interval indicator as the uplink transmission interval, the preemption indicator may be transmitted through the downlink control channel of the transmission interval which is not previously configured by higher signaling, or may be transmitted through the downlink control channel of the next transmission interval which is previously configured by higher signaling.

Alternatively, in a case in which preemption occurs in the N-th transmission interval 966 or the (N+1)-th transmission interval 968, when the (N+2)-th transmission interval 970 is changed to the uplink dedicated interval even though the fact that the downlink control information including the corresponding preemption indicator is transmitted through the downlink control channel 948 of the (N+2)-th transmission interval 970 is previously configured by higher signaling, the BS discards the downlink control information transmission including the corresponding preemption indicator (that is, the BS does not transmit the downlink preemption indicator including the preemption indicator).

The BS transmits, to the UE, the downlink control information including the preemption information for the y-th transmission interval through the (UE common or UE-specific) downlink control channel of the (N+n)-th valid downlink transmission interval which is previously configured by higher signaling. Alternatively, the BS transmits, to the UE, the downlink control information including the preemption information for the y-th transmission interval through the (UE common or UE-specific) downlink control channel of the (N+n)-th valid downlink transmission interval which is previously configured by higher signaling or is not previously configured. The values of y and n are arbitrary integer values, and N is a system frame number (SFN), a slot number, or an arbitrary natural value.

The valid downlink transmission interval previously configured by higher signaling refers to a transmission interval in which the downlink control information allocated in advance to the UE by the BS by higher signaling exists among the remaining transmission intervals except the uplink dedicated transmission interval. For example, in the second transmission structure 940, the N-th transmission interval 966 and the (N+4)-th transmission interval 974 may be examples of the valid downlink transmission intervals previously configured by the higher signaling.

The valid downlink transmission interval which is not previously configured by the higher signaling refers to a transmission interval in which the downlink control information allocated in advance to the UE by the BS by higher signaling does not exist among the remaining transmission intervals except the uplink dedicated transmission interval. For example, in the second transmission structure 940, the (N+3)-th transmission interval 972 may be an example of the valid downlink transmission interval which is not previously configured by the higher signaling.

Alternatively, the BS transmits, to the UE, the downlink control information including the preemption information for the most recent valid (y−n)-th a downlink transmission interval(s) through the downlink control channel which is previously configured (in a UE common or UE-specific manner) by higher signaling of the y-th downlink transmission interval. The values of y, a, and n are arbitrary integer values, and the valid downlink transmission interval may refer to the remaining transmission intervals except the uplink-centered transmission interval or the uplink dedicated transmission interval.

Alternatively, the BS transmits, to the UE, the downlink control information including the preemption information for the most recent valid (y−n)-th a downlink transmission interval(s) through the downlink control channel which is previously configured by higher signaling or is not previously configured (in a UE common or UE-specific manner) by higher signaling of the y-th downlink transmission interval. The values of y, a, and n are arbitrary integer values, and the valid downlink transmission interval may refer to the remaining transmission intervals except the uplink-centered transmission interval or the uplink dedicated transmission interval.

The valid downlink transmission interval which is previously configured by the higher signaling or is not previously configured by the higher signaling refers to both a transmission interval in which the downlink control information allocated in advance to the UE by the BS by higher signaling exists among the remaining transmission intervals except the uplink dedicated transmission interval and a transmission interval in which the downlink control information does not exist. For example, in the second transmission structure 940, the N-th transmission interval 966 and the (N+4)-th transmission interval 974 may be examples of the valid downlink transmission interval which is previously configured by the higher signaling. In the second transmission structure 940, the (N+3)-th transmission interval 972 may be an example of the valid downlink transmission interval which is not previously configured by the higher signaling.

The UE receives, from the BS, the downlink control information including the preemption information for the y-th transmission interval through the (UE common or UE-specific) downlink control channel of the (N+n)-th valid downlink transmission interval which is previously configured by higher signaling. Alternatively, the UE receives, from the BS, the downlink control information including the preemption information for the y-th transmission interval through the (UE common or UE-specific) downlink control channel of the (N+n)-th valid downlink transmission interval which is previously configured by higher signaling or is not previously configured by higher signaling. The values of y and n are arbitrary integer values, and N is a system frame number (SFN), a slot number, or an arbitrary natural value.

Alternatively, the UE receives, from the BS, the downlink control information including the preemption information for the most recent valid (y−n)-th a downlink transmission interval(s) through the downlink control channel which is previously configured by higher signaling of the y-th downlink transmission interval (in a UE common or UE-specific manner). The values of y, a, and n are arbitrary integer values, and the valid downlink transmission interval may refer to the remaining transmission intervals except the uplink-centered transmission interval or the uplink dedicated transmission interval.

Alternatively, the UE receives, from the BS, the downlink control information including the preemption information for the most recent (y−n)-th a downlink transmission interval(s) through the downlink control channel which is previously configured by higher signaling or which is not previously configured (in a UE common or UE-specific manner) by higher signaling of the y-th downlink transmission interval. The values of y, a, and n are arbitrary integer values, and the valid downlink transmission interval may refer to the remaining transmission intervals except the uplink-centered transmission interval or the uplink dedicated transmission interval.

Figure 10:
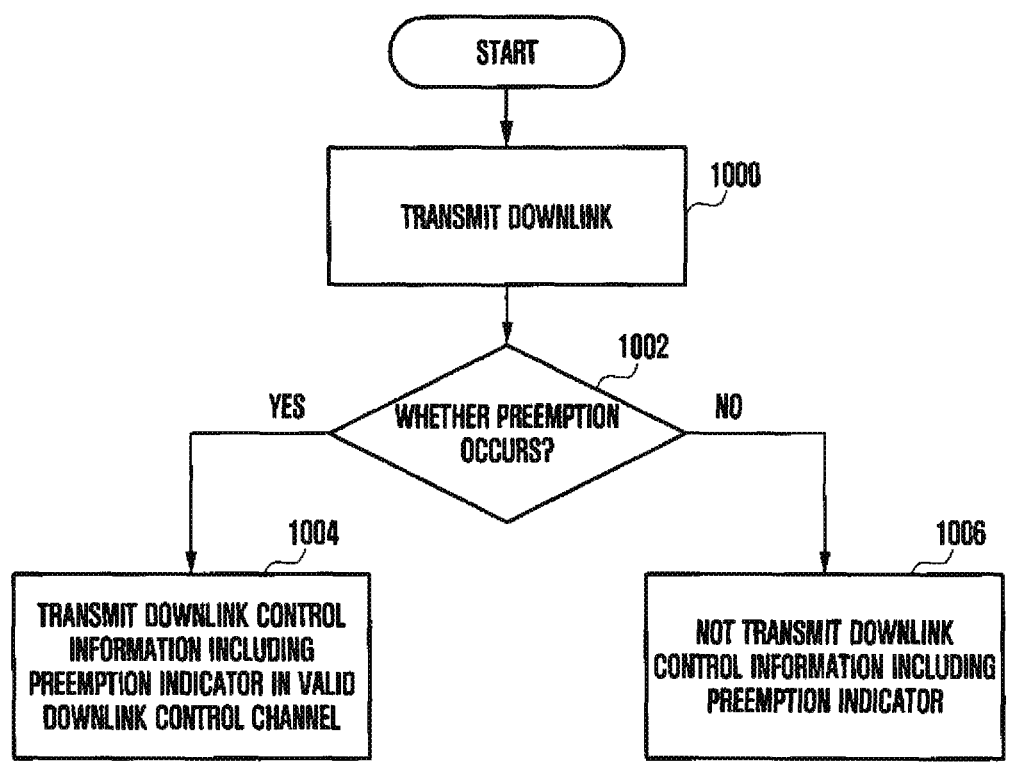
FIG. 10 is a flowchart illustrating the operation of a BS according to a second embodiment.

FIG. 10 is a flowchart illustrating the operation of a BS according to a second embodiment.

In FIG. 10, in operation 1000, the BS performs downlink transmission. The downlink transmission includes all kinds of transmissions to a UE in the downlink. For example, the downlink transmission may include first type data, third type data, reference signals, or control information. In operation 1002, the BS determines whether all or some of the downlink resource regions are preempted by second type data in the r-th downlink transmission interval.

When the preemption occurs, in operation 1004, the BS transmits downlink control information including the preemption indicator to a UE in a downlink control channel which is previously configured by higher signaling in a valid (r+b)-th downlink transmission interval (or which is explicitly configured in an implicit manner or by L1 signaling without being configured by higher signaling).

The valid downlink transmission interval may correspond to a downlink dedicated transmission interval, a downlink-centered transmission interval, an uplink-centered transmission interval, or a combination thereof. Alternatively, the valid downlink transmission interval may correspond to the downlink dedicated transmission interval, the downlink-centered transmission interval, the uplink-centered transmission interval, or a transmission interval including the downlink control channel which is previously configured by higher signaling among the combinations thereof. The values of r and b may be arbitrary integer values.

If the preemption does not occur, in operation 1006, the BS does not transmit the downlink control information including the preemption indicator to the UE. Alternatively, if the preemption does not occur in a specific transmission interval, in operation 1006, the BS does not transmit, to the UE, the downlink control information including the preemption indicator in the downlink control channel which is configured to previously transmit the preemption information for the corresponding transmission interval.

Figure 11:
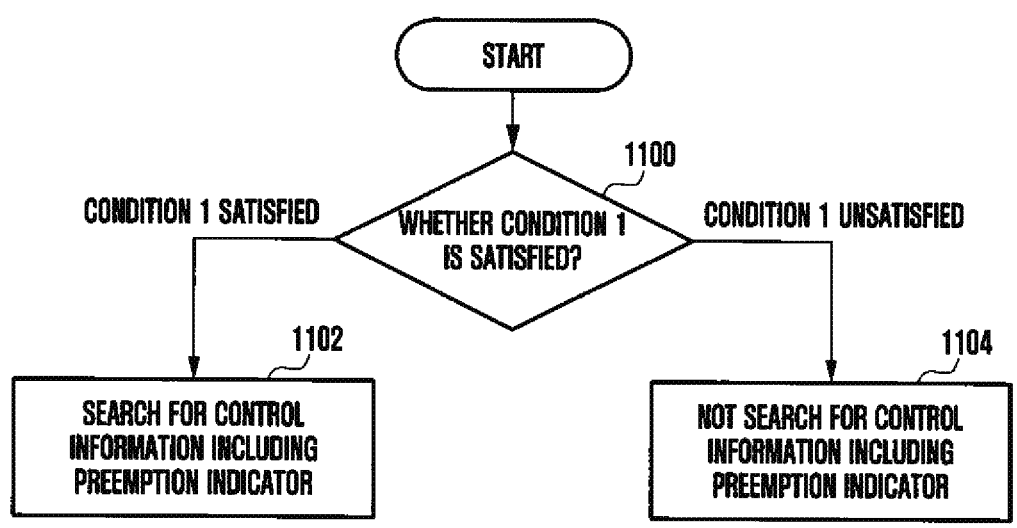
FIG. 11 is a flowchart illustrating the operation of a UE according to a second embodiment.

FIG. 11 is a flowchart illustrating the operation of a UE according to a second embodiment.

In FIG. 11, in operation 1100, a UE determines conditions according to whether downlink data is scheduled, whether downlink reference signal measurement is configured, and a method in which a transmission interval is indicated according to a transmission interval indicator.

When the UE needs to receive downlink data, when the UE needs to measure the downlink reference signal, and when the UE corresponds to a valid downlink transmission interval, these correspond to conditions 1. In operation 1102, the UE searches for control information including a preemption indicator when at least one of the conditions 1 is satisfied. Alternatively, when the at least one of the conditions 1 is satisfied, in operation 1102, the UE searches for the control information including the preemption indicator in one of the following transmission intervals.

Recent valid downlink transmission interval immediately after downlink data reception interval Recent valid downlink transmission interval immediately after downlink reference signal measurement interval Recent valid two or more downlink transmission intervals immediately after downlink data reception interval Recent valid two or more downlink transmission intervals immediately after downlink reference signal measurement interval Recent valid downlink transmission interval(s) immediately after downlink data reception interval and before HARQ-ACK feedback report interval Recent valid downlink transmission interval(s) immediately after downlink reference signal measurement interval and before measurement report interval Recent valid downlink transmission interval(s) immediately after downlink data reception interval and before retransmission reception interval Recent valid downlink transmission interval(s) immediately after downlink reference signal measurement interval and before re-measurement interval Recent valid downlink transmission interval including downlink data reception interval Recent valid downlink transmission interval including downlink reference signal measurement interval Recent valid two or more downlink transmission interval(s) including downlink data reception interval Recent valid two or more downlink transmission interval(s) including downlink reference signal measurement interval Recent valid downlink transmission interval(s) including downlink data reception interval before HARQ-ACK feedback report interval Recent valid downlink transmission interval(s) including downlink reference signal measurement interval before measurement report interval Recent valid downlink transmission interval(s) including downlink data reception interval before re-transmission reception interval Recent valid downlink transmission interval(s) including downlink reference signal measurement interval before re-measurement interval The valid downlink transmission interval refers to sets of the remaining transmission intervals except at least the uplink dedicated transmission interval. Alternatively, the valid downlink transmission interval refers to a set of transmission intervals including a (UE common or UE-specific) downlink control channel which is previously configured by higher signaling among sets of the remaining transmission intervals except the at least uplink dedicated transmission interval. Alternatively, the valid downlink transmission interval refers to a set of transmission intervals including the (UE common or UE-specific) downlink control channel which is previously configured by higher signaling or not previously configured by higher signaling among the sets of the remaining transmission intervals except the at least uplink dedicated transmission interval.

Alternatively, the UE may determine only one of the three conditions of the condition 1. For example, it may be determined that the condition 1 is satisfied when the UE receives downlink data and the condition 1 is not satisfied when the UE does not receive downlink data. Alternatively, it may be determined that, when the UE is configured to measure a downlink reference signal, the condition 1 is satisfied and otherwise, the condition 1 is not satisfied. Alternatively, the UE may determine that, when a valid downlink transmission interval is configured, the condition 1 is satisfied and otherwise, the condition 1 is not satisfied.

Alternatively, the UE may determine only two of the three conditions of the condition 1. For example, it may be determined that, when the UE receives the downlink data or is configured to measure the downlink reference signal, the condition 1 is satisfied and otherwise, the condition 1 is not satisfied. This determination may be applicable to a combination of conditions not described.

When the condition 1 is not satisfied, in operation 1104, the UE does not search for the control information including the preemption indicator information. Alternatively, in operation 1104, the UE does not search for the control information including the preemption indicator in one of the following transmission intervals.

Recent valid downlink transmission interval immediately after downlink data non-reception interval Recent valid downlink transmission interval immediately after downlink reference signal non-measurement interval Recent valid two or more downlink transmission intervals immediately after downlink data non-reception interval Recent valid two or more downlink transmission intervals immediately after downlink reference signal non-measurement interval Recent valid downlink transmission interval(s) immediately after downlink data non-reception interval and before new data reception Recent valid downlink transmission interval(s) immediately after downlink reference signal non-measurement interval and before new measurement report interval Recent valid downlink transmission interval including downlink data non-reception interval Recent valid downlink transmission interval including downlink reference signal non-measurement interval Recent valid two or more downlink transmission interval(s) including downlink data non-reception interval Recent valid two or more downlink transmission interval(s) including downlink reference signal non-measurement interval Recent valid downlink transmission interval(s) including downlink data non-reception interval before new data reception Recent valid downlink transmission interval(s) including downlink reference signal non-measurement interval and before measurement report interval The invalid downlink transmission interval refers to an uplink dedicated transmission interval. Alternatively, the valid downlink transmission interval refers to sets of the remaining transmission intervals except at least the uplink dedicated transmission interval. Alternatively, the valid downlink transmission interval refers to a set of transmission intervals including a (UE common or UE-specific) downlink control channel which is previously configured by higher signaling among the sets of the remaining transmission intervals except the at least uplink dedicated transmission interval. Alternatively, the valid downlink transmission interval refers to a set of transmission intervals including the (UE common or UE-specific) downlink control channel that is previously configured or not configured by higher signaling among the sets of the remaining transmission intervals except the at least uplink dedicated transmission interval.

Alternatively, when a resource region (composed of time and frequency) indicated by the preemption indicator included in the downlink control information transmitted through the downlink control channel occupies a downlink data channel resource region allocated in advance through another downlink control information by a predetermined threshold value, the UE does not use an uplink control channel resource (that is, a resource for transmitting HARQ-ACK for data reception and a resource for transmitting measurement report for reference signal measurement) which is configured for the downlink data reception (or the downlink reference signal measurement). Alternatively, the UE does not perform HARQ-ACK (or measurement report) through the uplink control channel resource which is configured for the downlink data channel resource reception (or reference signal measurement).

Figure 12:
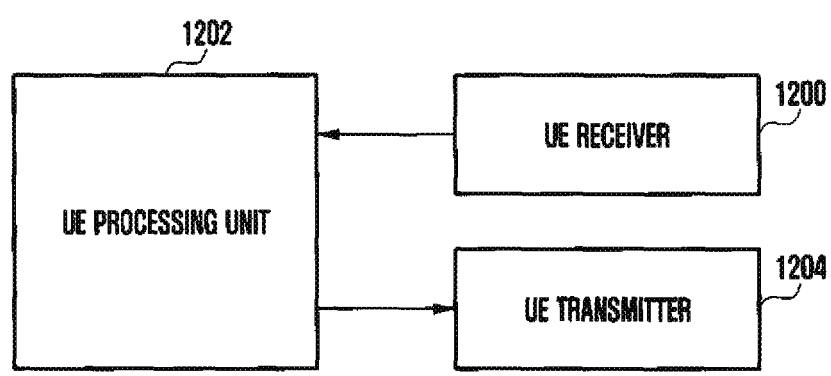
FIG. 12 is a block diagram illustrating the structure of a UE according to embodiments.

FIG. 12 is a block diagram illustrating the structure of a UE according to embodiments.

Referring to FIG. 12, a UE of the disclosure may include a UE receiver 1200, a UE transmitter 1204, and a UE processing unit 1202. The UE receiver 1200 and the UE transmitter 1204 may collectively be referred to as a transceiver in the embodiment. The transceiver may transmit and receive signals to and from a BS. The signal may include control information and data. To this end, the transceiver may include an RF transmitter for up-converting and amplifying the frequency of a transmitted signal, an RF receiver for low-noise amplifying a received signal and down-converting a frequency, and the like. Also, the transceiver may receive a signal through a wireless channel, output the received signal to the UE processing unit 1202, and transmit a signal output from the UE processing unit 1202 through the wireless channel. The UE processing unit 1202 may control a series of processes so that the UE may operate according to the above-described embodiment. For example, the UE receiver 1200 may receive a signal including second signal transmission timing information from the BS, and the UE processing unit 1202 may control to interpret a second signal transmission timing. Next, the UE transmitter 1204 may transmit a second signal at the timing.

Figure 13:
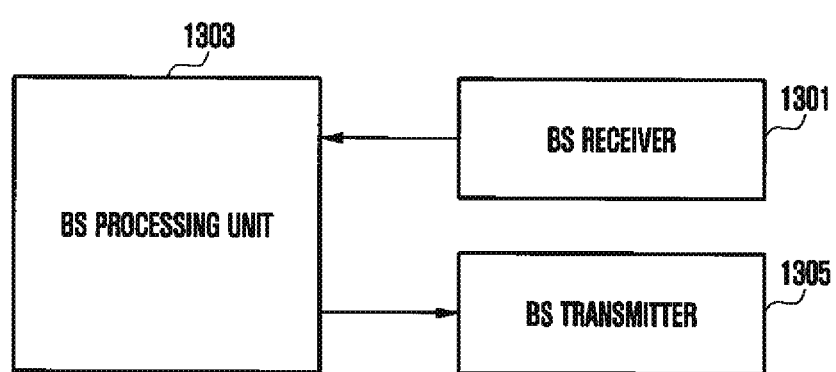
FIG. 13 is a block diagram illustrating the structure of a BS according to an embodiment.

FIG. 13 is a block diagram illustrating the structure of a BS according to an embodiment.

Referring to FIG. 13, in an embodiment, a BS may include at least one of a BS receiver 1301, a BS transmitter 1305, and a BS processing unit 1303. The BS receiver 1301 and the BS transmitter 1305 may collectively be referred to as a transceiver in the embodiment. The transceiver may transmit and receive signals to and from a UE. The signal may include control information and data. To this end, the transceiver may include an RF transmitter for up-converting and amplifying the frequency of a transmitted signal, an RF receiver for low-noise amplifying a received signal and down-converting a frequency, and the like. Also, the transceiver may receive a signal through a wireless channel, output the received signal to the BS processing unit 1303, and transmit a signal output from the BS processing unit 1303 through the wireless channel. The BS processing unit 1303 may control a series of processes so that the BS may operate according to the above-described embodiment. For example, the BS processing unit 1303 may determine a second signal transmission timing and may control to generate the second signal transmission timing information to be transmitted to the UE. Next, the BS transmitter 1305 may transmit the timing information to the UE, and the BS receiver 1301 may receive a second signal at the above-described timing. In addition, according to an embodiment, the BS processing unit 1303 may control to generate downlink control information (DCI) including the second signal transmission timing information. In this case, it is possible to indicate that the DCI is the second signal transmission timing information.

Meanwhile, the embodiments disclosed in the disclosure and the accompanying drawings are merely presented as examples in order to easily describe the disclosure and facilitate understanding of the disclosure but are not intended to limit the scope of the disclosure. It will be apparent to those skilled in the art to which the disclosure pertains that different modifications based on the technical idea of the disclosure may be practiced. In addition, embodiments described herein may be combined and practiced as needed. For example, the base station and the terminal may be operated by combining the parts of the first and second embodiments. In addition, although the disclosure is presented based on the NR system, other modifications based on the disclosure may be applicable to other systems such as the FDD or the TDD LTE system.

In addition, the specification and drawings disclose preferred embodiments, although specific terms are used, these are merely used in a general sense to easily explain the technical contents of the disclosure and to help the understanding of the disclosure. It is not intended to limit the scope of the disclosure. It is obvious to those skilled in the art to which the disclosure pertains that other modified embodiments on the basis of the spirit of the disclosure besides the embodiments disclosed herein can be carried out.

Figure 14:
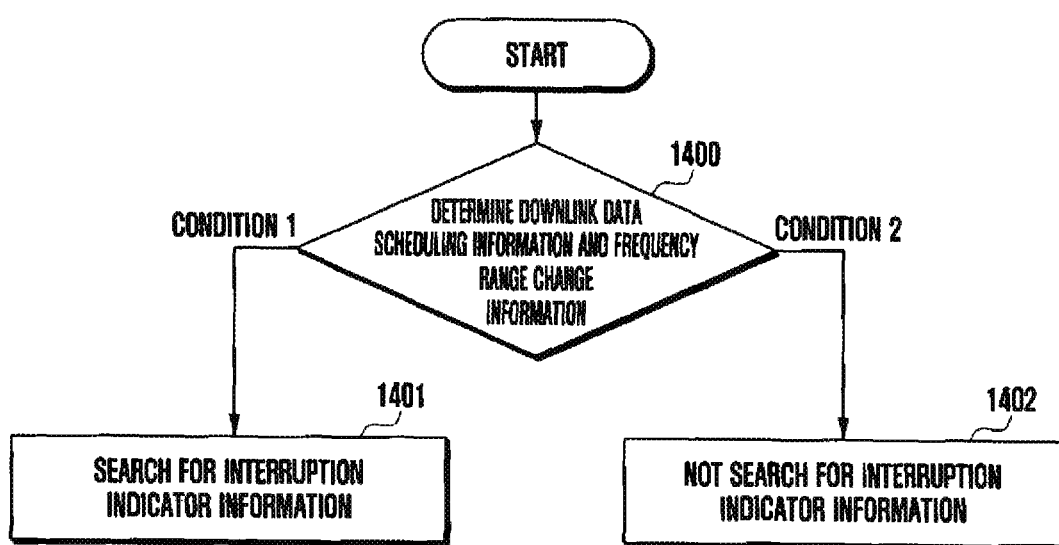
FIG. 14 is a diagram illustrating an example of an operation for performing interruption searching by a UE in accordance with frequency range change information and downlink data scheduling information according to an embodiment.

FIG. 14 is a diagram illustrating an example of an operation for performing interruption searching by a UE in accordance with frequency range change information and downlink data scheduling information according to an embodiment.

It is possible to configure one or two or more downlink or uplink frequency ranges in a UE, and the downlink frequency range and the uplink frequency range may be the same or not the same. The UE may be configured with a plurality of downlink or uplink frequency range candidates in advance, and one or two or more interval candidates selected therefrom may be configured by UE-specific or UE common higher signaling (or L1 signaling). Alternatively, a specific downlink or uplink frequency range may be changed by UE-specific or UE common higher signaling (or L1 signaling). The UE may perform downlink control information searching including a CRC scrambled with an RNTI indicating downlink data scheduling. Alternatively, the UE may search for downlink control information including a CRC scrambled with an RNTI indicating frequency range change information. Alternatively, in operation 1400, the UE may expect to search for the downlink control information including the CRC scrambled with the RNTI indicating the downlink data scheduling and to search for the downlink control information including the CRC scrambled with the RNTI indicating the frequency range change information.

In the disclosure, the frequency range means the size of the frequency domain in which the UE is actually used for data transmission and reception, and may be equal to or smaller than the size of the system frequency band operated by the BS.

When a condition 1 is satisfied, in operation 1401, the UE searches for downlink control information including a CRC scrambled with an RNTI indicating interruption indicator information associated with a downlink data-scheduled resource region.

When a condition 2 is satisfied, in operation 1402, the UE does not search for the downlink control information including the CRC scrambled with the RNTI indicating interruption indicator information associated with the downlink data-scheduled resource region.

Alternatively, when the condition 2 is satisfied, in operation 1402, the UE may expect not to search for the downlink control information (which exists in the downlink control information region of the changed frequency range) including the CRC scrambled with the RNTI indicating the interruption indicator information.

Alternatively, when the condition 2 is satisfied, the UE may expect not to use the corresponding information even when the corresponding information is detected by searching for the downlink control information (which exists in the downlink control information region of the changed frequency range) including the CRC scrambled with the RNTI indicating the interruption indicator information. That is, it may be possible for the UE to implicitly determine that the detected information is invalid.

The condition 1 may correspond to one or two or more of the following cases.

1. Case where UE successfully searches for (or receives) downlink control information including CRC scrambled with RNTI indicating downlink data scheduling 2. Case where UE fails to search for (or fails to receive) downlink control information including CRC scrambled with RNTI indicating frequency range change information The condition 2 may correspond to one or two or more of the following cases.

1. Case where UE fails to search for (or fails to receive) downlink control information including CRC scrambled with RNTI indicating downlink data scheduling 2. Case where UE successfully searches for (or receives) downlink control information including CRC scrambled with RNTI indicating frequency range change information 3. Case where UE successfully searches for (or receives) downlink control information including CRC scrambled with RNTI indicating downlink data scheduling, and successfully searches for (or receives) downlink control information including CRC scrambled with RNTI indicating frequency range change information In a case in which the interruption indicator information transmission interval is a 1 slot unit, as an example according to the above conditions, if the UE receives downlink control information instructing downlink data scheduling in an n-th slot and receives downlink data information, the UE may search for UE common downlink control information including the interruption indicator information associated with the corresponding data information in an (n+1)-th slot. As another example according to the condition 1, if the UE receives downlink control information indicating downlink data scheduling in the n-th slot, receives the downlink data information, and does not receive information indicating frequency range change information, the UE may search for the UE common downlink control information including the interruption indicator information associated with the corresponding data information in an (n+1)-th slot.

That is, in a situation where the n-th slot and the (n+1)-th slot indicate the same frequency range, if the UE receives the downlink control information indicating the downlink data scheduling, the UE searches for the downlink control information including the interruption indicator information. On the contrary, when the UE does not receive the downlink control information indicating the downlink data information scheduling, the UE may not search for the downlink control information including the interruption indicator information. Alternatively, when the UE receives the frequency range change information having a frequency range in which the (n+1)-th slot is different from the n-th slot, the UE may not search for the downlink control information including the interruption indicator information transmitted from the (n+1)-th slot regardless of searching for control information instructing downlink data scheduling in the n-th slot interval.

As another example, when a frequency range including a downlink control region in which the downlink control information including the CRC scrambled with the RNTI indicating the interruption indicator information is transmitted and a frequency range including a downlink link data region scheduled within a time interval indicated by the interruption indicator information are not the same, the UE may expect not to search for the downlink control information including the CRC scrambled with the RNTI indicating the interruption indicator information. Alternatively, as another example, when the frequency range including the downlink control region in which the downlink control information including the CRC scrambled with the RNTI indicating the interruption indicator information is transmitted and the frequency range including the downlink link data region scheduled within the time interval indicated by the interruption indicator information are the same or only some of the intervals overlap, the UE may expect to search for the downlink control information including the CRC scrambled with the RNTI indicating the interruption indicator information.

Figure 15:
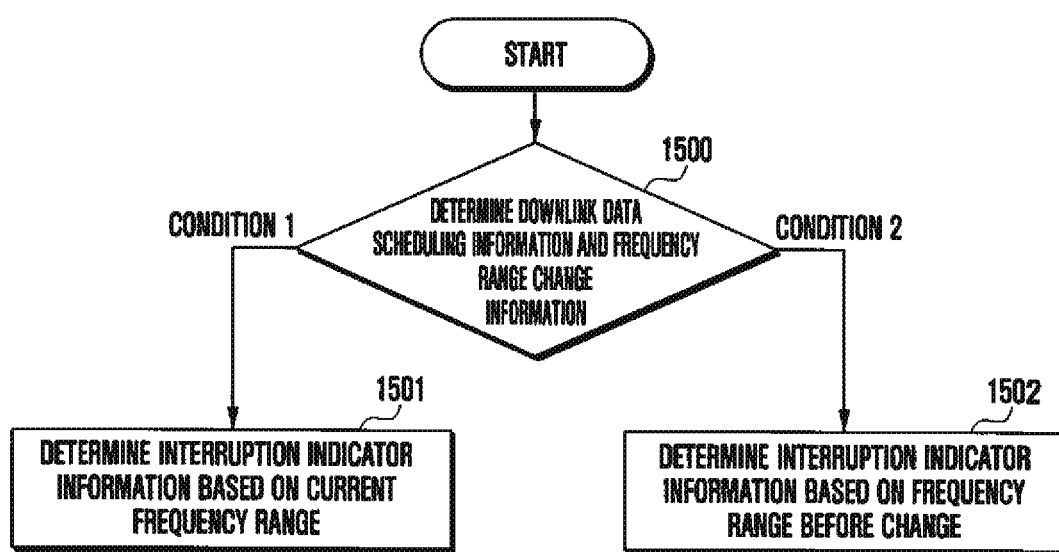
FIG. 15 is a diagram illustrating an example of an operation for performing interruption determination by a UE in accordance with frequency range change information and downlink data scheduling information according to an embodiment.

FIG. 15 is a diagram illustrating an example of an operation for performing interruption determination by a UE in accordance with frequency range change information and downlink data scheduling information according to an embodiment.

It is possible to configure one or two or more downlink or uplink frequency ranges in a UE. In addition, it is possible to change a specific frequency range by UE-specific or UE common higher signaling (or L1 signaling). The UE may search for downlink control information including a CRC scrambled with an RNTI indicating downlink data scheduling. Alternatively, the UE may search for the downlink control information including the CRC scrambled with the RNTI indicating the frequency range change information. Alternatively, in operation 1500, the UE may expect to search for the downlink control information including the CRC scrambled with the RNTI indicating the downlink data scheduling and the downlink control information including the CRC scrambled with the RNTI indicating the frequency range change information. The interruption indicator information is regarded as a maximum frequency domain in which a frequency range configured in the UE can be indicated by the interruption indicator information, and an interval in which the interruption indicator information is transmitted is considered as a maximum time that can be indicated by the interruption indicator information.

When the condition 1 is satisfied, in operation 1501, the UE may expect to determine the interruption indicator information according to the frequency domain based on a current frequency range. For example, when the n-th slot and the (n+1)-th slots correspond to the same frequency range, the UE may assume that the interruption indicator information to be transmitted in the (n+1)-th slot is for an n-th slot frequency range sharing the same frequency range as the (n+1)-th slot. As another example, the UE may determine that the frequency domain that can be indicated by the interruption indicator information is the frequency domain based on the current frequency range.

When the condition 2 is satisfied, in operation 1502, the UE may expect to determine the interruption indicator information according to the frequency domain based on the frequency range before a change. For example, when the n-th slot and the (n+1)-th slot correspond to different frequency ranges, the UE may determine that the interruption indicator information to be transmitted in the (n+1)-th slot is information based on the frequency range of the n-th slot. That is, the UE may determine that the interruption indicator information transmitted in the (n+1)-th slot is the interruption indicator information based on the frequency range of the n-th slot other than the interruption indicator information based on the frequency range of the (n+1)-th slot. As another example, the UE may determine that the frequency domain that can be indicated by the interruption indicator information is the frequency domain based on the immediately previous frequency range (or the frequency range in which downlink data scheduling that can be indicated by the interruption indicator information is performed).

The condition 1 is as below.

1. Case where UE does not search for (or does not receive) downlink control information including CRC scrambled with RNTI indicating frequency range change information The condition 2 is as below.

1. Case where UE searches for (or receives) downlink control information including CRC scrambled with RNTI indicating frequency range change information As another embodiment, when the interruption indicator information indicated by the RNTI scrambled in the CRC included in the downlink control information for which is searched by the UE indicates the previous k slots, the UE may interpret the interruption indicator information by implicitly determining that the frequency range information applied to each of the previous k slots is applied to the interruption indicator information. For example, in a case in which k 3 is satisfied, when each slot operates in a first frequency range, a second frequency range, and a third frequency range, the UE may interpret the interruption indicator information for the frequency domain corresponding to each frequency range.

Figure 16:
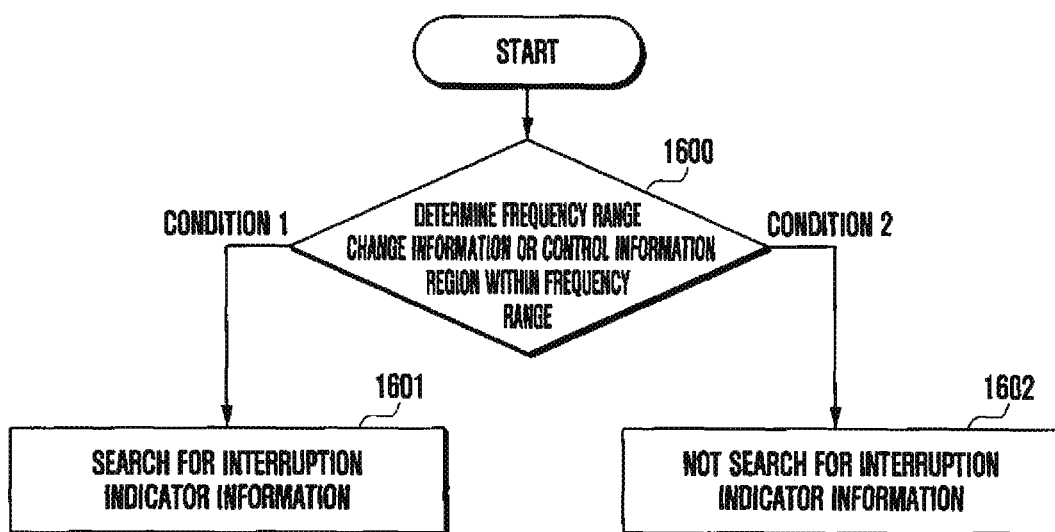
FIG. 16 is a diagram illustrating an example of an operation for performing interruption searching by a UE in accordance with frequency range change information and a downlink control information region existing in a frequency range according to an embodiment.

FIG. 16 is a diagram illustrating an example of an operation for performing interruption searching by a UE in accordance with frequency range change information and a downlink control information region existing in a frequency range according to an embodiment.

It is possible to configure one or two or more downlink or uplink frequency ranges in a UE. The downlink frequency range and the uplink frequency range may be the same or may not be the same. The UE may be configured with a plurality of downlink or uplink frequency range candidates in advance, and one or two or more interval candidates selected therefrom may be configured by UE-specific or UE common higher signaling (or L1 signaling). Alternatively, a specific downlink or uplink frequency range may be changed by UE-specific or UE common higher signaling (or L1 signaling). The UE may search for downlink control information including a CRC scrambled with an RNTI indicating downlink data scheduling. Alternatively, the UE may search for downlink control information including a CRC scrambled with an RNTI indicating frequency range change information. Alternatively, in operation 1600, the UE may expect to search for the downlink control information including the CRC scrambled with the RNTI indicating the downlink data scheduling and the downlink control information including the CRC scrambled with the RNTI indicating the frequency range change information.

When the condition 1 is satisfied, in operation 1601, the UE searches for the downlink control information including the CRC scrambled with the RNTI indicating the interruption indicator information associated with a downlink data-scheduled resource region.

When the condition 2 is satisfied, in operation 1602, the UE does not search for the downlink control information including the CRC scrambled with the RNTI indicating the interruption indicator information associated with the downlink data-scheduled resource region.

The condition 1 may be one or two or more of the following cases.

1. Case where there is no frequency range change in time resource region indicated by previous slot(s) or interruption indicator 2. Case where frequency range before change and frequency range after change are the same even though there is a frequency range change or overlap by predetermined portion or more (e.g., case where frequency range corresponding to k-th slot and frequency range corresponding to (k+1)-th slot overlap by predetermined portion or more)

3. Case where downlink control information region (control resource set (CORESET)) for which the UE searches and downlink control information searching space are the same or overlap by predetermined portion or more even though there is frequency range change 4. Case where downlink control information region or control information searching space to which interruption indicator information is to be transmitted is fixed even though there is a frequency range change The condition 2 may be one or two or more of the following cases.

1. Case where there is a frequency range change in time resource region indicated by previous slot(s) or interruption indicator 2. Case where portion in which frequency range before change and frequency range after change overlap each other according to frequency range change is equal to or less than predetermined portion (e.g., case where frequency range corresponding to k-th slot and frequency range corresponding to (k+1)-th slot overlap by predetermined threshold value or predetermined portion or less)

3. Case where downlink control information region (control resource set) for which the UE searches and downlink control information searching space are the same or overlap by predetermined portion or less even though there is frequency range change 4. Case where downlink control information region or control information searching space to which interruption indicator information is to be transmitted is changed even though there is a frequency range change

The invention claimed is:
1. A method of receiving control information by a user equipment (UE) of a wireless communication system, the method comprising:
determining whether to monitor interruption information; and
receiving downlink control information including the interruption information using a specific radio network temporary identifier (RNTI) for the interruption information in case that the interruption information is monitored, wherein:
a transmission interval indicated by the interruption information is determined according to a configuration period of a downlink control channel on which the interruption information is transmitted,
the interruption information indicates whether a previous transmission interval prior to the transmission interval including the interruption information is preempted, and
the interruption information includes a bitmap indicating a frequency or time resource existing within the transmission interval.

2. The method of claim 1, wherein monitoring the interruption information is performed in case that downlink data is scheduled for the UE or in case that downlink reference signal measurement is configured for the UE.

3. The method of claim 1, wherein monitoring the interruption information is performed in case that a transmission interval in which transmission of the interruption information is previously configured is not an uplink transmission interval and downlink data is scheduled in the previous transmission interval, or in case that downlink reference signal measurement is configured for the UE.

4. The method of claim 3, wherein the interruption information indicates a resource of the previous transmission interval corresponding to a downlink transmission interval.

5. A method of transmitting control information by a base station (BS) of a wireless communication system, the method comprising:
determining whether to transmit interruption information; and
transmitting downlink control information including the interruption information using a specific radio network temporary identifier (RNTI) for the interruption information in case that the interruption information is transmitted, wherein:
a transmission interval indicated by the interruption information is determined according to a configuration period of a downlink control channel on which the interruption information is transmitted,
the interruption information indicates whether a previous transmission interval prior to the transmission interval including the interruption information is preempted, and
the interruption information includes a bitmap indicating a frequency or time resource existing within the transmission interval.

6. The method of claim 5, wherein the interruption information is transmitted in case that downlink data is scheduled for a user equipment (UE) or in case that downlink reference signal measurement is configured for the UE.

7. The method of claim 6, wherein the interruption information is transmitted, in case that a transmission interval in which transmission of the interruption information is previously configured is not an uplink transmission interval and downlink data is scheduled in the previous transmission interval, or in case that downlink reference signal measurement is configured for the UE.

8. The method of claim 7, wherein the interruption information indicates a resource of the previous transmission interval corresponding to a downlink transmission interval.

9. A user equipment (UE) receiving control information of a wireless communication system, the UE comprising:
a transceiver; and
a controller connected to the transceiver, and configured to determine whether to monitor interruption information and to receive downlink control information including the interruption information using a specific radio network temporary identifier (RNTI) for the interruption information in case that the interruption information is monitored, wherein:
a transmission interval indicated by the interruption information is determined according to a configuration period of a downlink control channel on which the interruption information is transmitted,
the interruption information indicates whether a previous transmission interval prior to the transmission interval including the interruption information is preempted, and
the interruption information includes a bitmap indicating a frequency or time resource existing within the transmission interval.

10. The UE of claim 9, wherein monitoring the interruption information is performed in case that downlink data is scheduled for the UE or in case that downlink reference signal measurement is configured for the UE.

11. The UE of claim 9, wherein monitoring the interruption information is performed in case that a transmission interval in which transmission of the interruption information is previously configured is not an uplink transmission interval and downlink data is scheduled in the previous transmission interval, or in case that downlink reference signal measurement is configured for the UE.

12. The UE of claim 10, wherein the interruption information indicates a resource of the previous transmission interval corresponding to a downlink transmission interval.

13. A base station (BS) transmitting control information of a wireless communication system, the BS comprising:
   a transceiver; and
   a controller configured to be connected to the transceiver, and to determine whether to transmit interruption information and to transmit downlink control information including the interruption information using a specific radio network temporary identifier (RNTI) for the interruption information in case that the interruption information is transmitted, wherein:
   a transmission interval indicated by the interruption information is determined according to a configuration period of a downlink control channel on which the interruption information is transmitted,
   the interruption information indicates whether a previous transmission interval prior to the transmission interval including the interruption information is preempted, and
   the interruption information includes a bitmap indicating a frequency or time resource existing within the transmission interval.

14. The BS of claim 13, wherein the interruption information is transmitted in case that downlink data is scheduled for a user equipment (UE) or in case that downlink reference signal measurement is configured for the UE.

15. The BS of claim 13, wherein:
   the interruption information is transmitted, in case that a transmission interval in which transmission of the interruption information is previously configured is not an uplink transmission interval and downlink data is scheduled in the previous transmission interval, or in case that downlink reference signal measurement is configured for the UE, and
   the interruption information indicates a resource of the previous transmission interval corresponding to a downlink transmission interval.

* * * * *